(12) United States Patent
Lin et al.

(10) Patent No.: US 8,259,808 B2
(45) Date of Patent: Sep. 4, 2012

(54) LOW COMPLEXITY VIDEO DECODER

(75) Inventors: Jian-Liang Lin, Yilan County (TW);
Fang-Yi Hsieh, Taipei (TW); Shen-Kai Chang, Hsinchu County (TW);
Shaw-Min Lei, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 277 days.

(21) Appl. No.: 12/732,177

(22) Filed: Mar. 25, 2010

(65) Prior Publication Data

US 2011/0235712 A1  Sep. 29, 2011

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.16
(58) Field of Classification Search ......... None
See application file for complete search history.

(56) References Cited

U.S. PATENT DOCUMENTS

| | | | |
|---|---|---|---|
| 6,909,753 B2 * | 6/2005 | Meehan et al. | 375/240.27 |
| 7,203,237 B2 * | 4/2007 | Fernandes | 375/240.16 |
| 7,280,595 B1 | 10/2007 | Lin | |
| 7,317,840 B2 * | 1/2008 | DeCegama | 382/240 |
| 7,630,569 B2 * | 12/2009 | DeCegama | 382/240 |
| 2005/0240386 A1 | 10/2005 | Carballo | |
| 2008/0089417 A1 | 4/2008 | Bao | |
| 2009/0003447 A1 | 1/2009 | Christoffersen | |
| 2010/0053352 A1 | 3/2010 | Dekel | |
| 2010/0226437 A1 | 9/2010 | Robertson | |

FOREIGN PATENT DOCUMENTS

| | | |
|---|---|---|
| EP | 1 655 966 A2 | 5/2006 |
| JP | 2007221697 A | 8/2007 |
| WO | 02078353 A1 | 10/2002 |
| WO | 2008060262 A1 | 5/2008 |
| WO | 2009073421 | 6/2009 |

OTHER PUBLICATIONS

Thomas Wiegand et al:"Overview of the H.264/AVC Video Coding Standard", IEEE Transactions on Circuits and Systems for Video Technology, vol. 13, No. 7, Jul. 2003, pp. 560-576, XP011099249, IEEE Service Center, NJ, US.
Yanmei Qu et al:"A Cost-effective VLD Architecture for MPEG-2 and AVS", Journal of Signal Processing Systems, vol. 52, No. 1, Oct. 2007, pp. 95-109, XP019616654, Boston, US.

(Continued)

*Primary Examiner* — Nhon Diep
(74) *Attorney, Agent, or Firm* — Winston Hsu; Scott Margo

(57) ABSTRACT

A low complexity video decoder includes: a fast variable length decoding (VLD) and inverse quantization module arranged to perform fast VLD and inverse quantization on an input bit stream to generate inverse quantization results; an inverse transform unit arranged to perform inverse transform on the inverse quantization results to generate inverse transform results; a motion compensation module arranged to perform motion compensation according to the input bit stream and generate associated prediction outputs, wherein the motion compensation module includes a temporal/spatial prediction unit arranged to perform temporal/spatial prediction to generate at least a portion of the prediction outputs; an arithmetic unit arranged to sum up the inverse transform results and the prediction outputs to generate compensated outputs; a reconstructed frame output unit arranged to generate reconstructed frames according to the compensated outputs; and a frame storage arranged to store some reconstructed frames.

30 Claims, 19 Drawing Sheets

OTHER PUBLICATIONS

Seong Hwan Cho et al:"A Low Power Variable Length Decoder for MPEG-2 Based on Nonuniform Fine-Grain Table Partitioning", IEEE Transactions on Very Large Scale Integration (VLSI) Systems, vol. 7, No. 2, Jun. 1999, pp. 249-256, XP000833596, IEEE Service Center, NJ,US.

Hyeong-Min Nam et al:"A Complexity Scalable H.264 Decoder with Downsizing Capability for Mobile Devices", IEEE Transactions on Consumer Electronics, vol. 56, No. 2, May 2010, pp. 1025-1033, XP011312771, IEEE Service Center, NY,US.

* cited by examiner $$\begin{bmatrix} 13 & 13 & 13 & 13 \\ 17 & 7 & -7 & -17 \\ 13 & -13 & -13 & 13 \\ 7 & -17 & 17 & -7 \end{bmatrix} \begin{bmatrix} c_{00} & c_{01} & c_{02} & c_{03} \\ c_{10} & c_{11} & c_{12} & c_{13} \\ c_{20} & c_{21} & c_{22} & c_{23} \\ c_{30} & c_{31} & c_{32} & c_{33} \end{bmatrix} \begin{bmatrix} 13 & 17 & 13 & 7 \\ 13 & 7 & -13 & -17 \\ 13 & -7 & -13 & 17 \\ 13 & -17 & 13 & -7 \end{bmatrix}$$

$$=\begin{bmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{bmatrix}\begin{bmatrix} 13 & 17 & 13 & 7 \\ 13 & 7 & -13 & -17 \\ 13 & -7 & -13 & 17 \\ 13 & -17 & 13 & -7 \end{bmatrix}$$

$$=\begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix}$$

FIG. 5A $$\begin{bmatrix} 13 & 13 & 13 & 13 \\ 17 & 7 & -7 & -17 \\ 13 & -13 & -13 & 13 \\ 7 & -17 & 17 & -7 \end{bmatrix} \begin{bmatrix} I_{00} & I_{01} & I_{02} & I_{03} \\ I_{10} & I_{11} & I_{12} & I_{13} \\ I_{20} & I_{21} & I_{22} & I_{23} \\ I_{30} & I_{31} & I_{32} & I_{33} \end{bmatrix} \begin{bmatrix} 13 & 17 & 13 & 7 \\ 13 & 7 & -13 & -17 \\ 13 & -7 & -13 & 17 \\ 13 & -17 & 13 & -7 \end{bmatrix}$$

$$= \begin{bmatrix} 13 & 13 & 13 & 13 \\ 17 & 7 & -7 & -17 \\ 13 & -13 & -13 & 13 \\ 7 & -17 & 17 & -7 \end{bmatrix} \begin{bmatrix} p_{00} & p_{01} & p_{02} & p_{03} \\ p_{10} & p_{11} & p_{12} & p_{13} \\ p_{20} & p_{21} & p_{22} & p_{23} \\ p_{30} & p_{31} & p_{32} & p_{33} \end{bmatrix} = \begin{bmatrix} r'_{00} & r'_{01} & r'_{02} & r'_{03} \\ r'_{10} & r'_{11} & r'_{12} & r'_{13} \\ r'_{20} & r'_{21} & r'_{22} & r'_{23} \\ r'_{30} & r'_{31} & r'_{32} & r'_{33} \end{bmatrix}$$

LOW COMPLEXITY VIDEO DECODER

BACKGROUND

The present invention relates to video decoding, and more particularly, to low complexity video decoders.

When an end user is viewing a video program utilizing a home theater system at home, encoded data of the video program is decoded for being displayed on a display panel of the home theater system, and the decoded results of the encoded data can be scaled up or scaled down to meet the size and resolution of the display panel. Typically, a decoding device of the home theater system can decode the encoded data with ease, no matter how complicated the algorithm for decoding the encoded data is, and no matter whether the resolution of the video program is high or not.

It would be very convenient for the end user to own a portable electronic device (e.g. a mobile phone or a personal digital assistant (PDA)) that can be utilized for viewing the same video program anywhere. However, when a research and development (R&D) team of a manufacturer is designing such a portable electronic device, some problems may arise. For example, the decoding capability of the portable electronic device may be insufficient in a situation where the algorithm for decoding the encoded data is too complicated and/or the resolution of the video program is high. In another example, the power consumption may be too high when one or more processing circuits within the portable electronic device operate at the highest operation frequency available. Thus, there is a need for highly efficient and cost effective video decoders, in order to implement the portable electronic device mentioned above.

SUMMARY

It is therefore an objective of the claimed invention to provide low complexity video decoders, in order to solve the above-mentioned problems.

It is another objective of the claimed invention to provide low complexity video decoders, in order to reduce the calculation load and the power consumption within a portable electronic device such as that mentioned above.

It is another objective of the claimed invention to provide low complexity video decoders, in order to reduce complexity of decoding operations by making at least a portion of components therein operate in accordance with the resolution of reconstructed frames to be displayed, rather than the resolution of original frames, since the resolution of a display panel of the portable electronic device is typically limited, and is typically lower than the resolution of the original frames. As a result, scaling down the reconstructed frames sometimes can be avoided.

An exemplary embodiment of a low complexity video decoder comprises: a fast variable length decoding (VLD) and inverse quantization module arranged to perform fast VLD and inverse quantization on an input bit stream to generate inverse quantization results; an inverse transform unit arranged to perform inverse transform on the inverse quantization results to generate inverse transform results; and a motion compensation module arranged to perform motion compensation according to the input bit stream and generate associated prediction outputs. The motion compensation module comprises: a temporal prediction unit arranged to perform temporal prediction to generate at least a portion of the prediction outputs; and a spatial prediction unit arranged to perform spatial prediction to generate at least a portion of the prediction outputs. In addition, the low complexity video decoder further comprises: an arithmetic unit arranged to sum up the inverse transform results and the prediction outputs to generate compensated outputs; a reconstructed frame output unit arranged to generate a plurality of reconstructed frames according to the compensated outputs, wherein the spatial prediction unit performs spatial prediction according to a current reconstructed frame of the reconstructed frames; and a frame storage arranged to temporarily store at least one portion of the reconstructed frames, wherein the temporal prediction unit performs temporal prediction according to the at least one portion of the reconstructed frames. Additionally, the temporal prediction unit operates in accordance with a resolution of the reconstructed frames, rather than a resolution of a plurality of original frames represented by the input bit stream, in order to reduce complexity of performing temporal prediction; and the temporal prediction unit further estimates at least a portion of partial information that has been omitted, in order to perform sub-pixel interpolation for use of performing temporal prediction. In particular, the resolution of the reconstructed frames is less than the resolution of the original frames.

An exemplary embodiment of a low complexity video decoder comprises: a fast VLD and inverse quantization module arranged to perform fast VLD and inverse quantization on an input bit stream to generate inverse quantization results; an inverse transform unit arranged to perform inverse transform on the inverse quantization results to generate inverse transform results; and a motion compensation module arranged to perform motion compensation according to the input bit stream and generate associated prediction outputs. The motion compensation module comprises: a temporal prediction unit arranged to perform temporal prediction to generate at least a portion of the prediction outputs; and a spatial prediction unit arranged to perform spatial prediction to generate at least a portion of the prediction outputs. In addition, the low complexity video decoder further comprises: an arithmetic unit arranged to sum up the inverse transform results and the prediction outputs to generate compensated outputs; a reconstructed frame output unit arranged to generate a plurality of reconstructed frames according to the compensated outputs, wherein the spatial prediction unit performs spatial prediction according to a current reconstructed frame of the reconstructed frames; and a frame storage arranged to temporarily store at least one portion of the reconstructed frames, wherein the temporal prediction unit performs temporal prediction according to the at least one portion of the reconstructed frames. Additionally, the spatial prediction unit operates in accordance with a resolution of the reconstructed frames, rather than a resolution of a plurality of original frames represented by the input bit stream, in order to reduce complexity of performing spatial prediction; and the spatial prediction unit further estimates at least a portion of partial information that has been omitted, in order to perform sub-pixel interpolation for use of performing spatial prediction. In particular, the resolution of the reconstructed frames is less than the resolution of the original frames.

An exemplary embodiment of a low complexity video decoder comprises: a fast VLD and inverse quantization module arranged to perform fast VLD and inverse quantization on an input bit stream to generate inverse quantization results; an inverse transform unit arranged to perform inverse transform on the inverse quantization results to generate inverse transform results; and a motion compensation module arranged to perform motion compensation according to the input bit stream and generate associated prediction outputs. The motion compensation module comprises: a temporal prediction unit arranged to perform temporal prediction to generate at least a portion of the prediction outputs; and a spatial prediction unit arranged to perform spatial prediction to generate at least a portion of the prediction outputs. In addition, the low complexity video decoder further comprises: an arithmetic unit arranged to sum up the inverse transform results and the prediction outputs to generate compensated outputs; a reconstructed frame output unit arranged to generate a plurality of reconstructed frames according to the compensated outputs, wherein the spatial prediction unit performs spatial prediction according to a current reconstructed frame of the reconstructed frames; and a frame storage arranged to temporarily store at least one portion of the reconstructed frames, wherein the temporal prediction unit performs temporal prediction according to the at least one portion of the reconstructed frames. Additionally, the inverse transform unit operates in accordance with a resolution of the reconstructed frames, rather than a resolution of a plurality of original frames represented by the input bit stream, in order to reduce complexity of performing the inverse transform; and the inverse transform unit omits a portion of calculations of the inverse transform. In particular, the resolution of the reconstructed frames is less than the resolution of the original frames.

An exemplary embodiment of a low complexity video decoder comprises: a fast VLD and inverse quantization module arranged to perform fast VLD and inverse quantization on an input bit stream to generate inverse quantization results; an inverse transform unit arranged to perform inverse transform on the inverse quantization results to generate inverse transform results; and a motion compensation module arranged to perform motion compensation according to the input bit stream and generate associated prediction outputs. The motion compensation module comprises: a temporal prediction unit arranged to perform temporal prediction to generate at least a portion of the prediction outputs; and a spatial prediction unit arranged to perform spatial prediction to generate at least a portion of the prediction outputs. In addition, the low complexity video decoder further comprises: an arithmetic unit arranged to sum up the inverse transform results and the prediction outputs to generate compensated outputs; a reconstructed frame output unit arranged to generate a plurality of reconstructed frames according to the compensated outputs, wherein the spatial prediction unit performs spatial prediction according to a current reconstructed frame of the reconstructed frames; and a frame storage arranged to temporarily store at least one portion of the reconstructed frames, wherein the temporal prediction unit performs temporal prediction according to the at least one portion of the reconstructed frames. Additionally, the reconstructed frame output unit operates in accordance with a resolution of the reconstructed frames, rather than a resolution of a plurality of original frames represented by the input bit stream, in order to reduce complexity of generating the reconstructed frames; and the reconstructed frame output unit comprises a low complexity de-blocking filter. In particular, the resolution of the reconstructed frames is less than the resolution of the original frames.

An exemplary embodiment of a low complexity video decoder comprises: a fast VLD and inverse quantization module arranged to perform fast VLD and inverse quantization on an input bit stream to generate inverse quantization results; an inverse transform unit arranged to perform inverse transform on the inverse quantization results to generate inverse transform results; and a motion compensation module arranged to perform motion compensation according to the input bit stream and generate associated prediction outputs. The motion compensation module comprises: a temporal prediction unit arranged to perform temporal prediction to generate at least a portion of the prediction outputs; and a spatial prediction unit arranged to perform spatial prediction to generate at least a portion of the prediction outputs. In addition, the low complexity video decoder further comprises: an arithmetic unit arranged to sum up the inverse transform results and the prediction outputs to generate compensated outputs; a reconstructed frame output unit arranged to generate a plurality of reconstructed frames according to the compensated outputs, wherein the spatial prediction unit performs spatial prediction according to a current reconstructed frame of the reconstructed frames; and a frame storage arranged to temporarily store at least one portion of the reconstructed frames, wherein the temporal prediction unit performs temporal prediction according to the at least one portion of the reconstructed frames. Additionally, the fast VLD and inverse quantization module operates in accordance with a resolution of the reconstructed frames, rather than a resolution of a plurality of original frames represented by the input bit stream, in order to reduce complexity of performing fast VLD and inverse quantization; and the fast VLD and inverse quantization module utilizes a lookup table comprising a main table and at least one sub-table during fast VLD, and a probability of utilizing the main table is greater than that of the at least one sub-table. In particular, the resolution of the reconstructed frames is less than the resolution of the original frames.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 5A-5B illustrate some calculations involved with low complexity inverse transform of the inverse transform unit shown in FIG. 1 according to different embodiments of the present invention.

FIGS. 6A-6B illustrate some inverse transform functions involved with the low complexity inverse transform of the inverse transform unit shown in FIG. 1 according to different embodiments of the present invention.

FIG. 8 illustrates some inverse transform functions involved with the low complexity inverse transform of the inverse transform unit shown in FIG. 1 according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
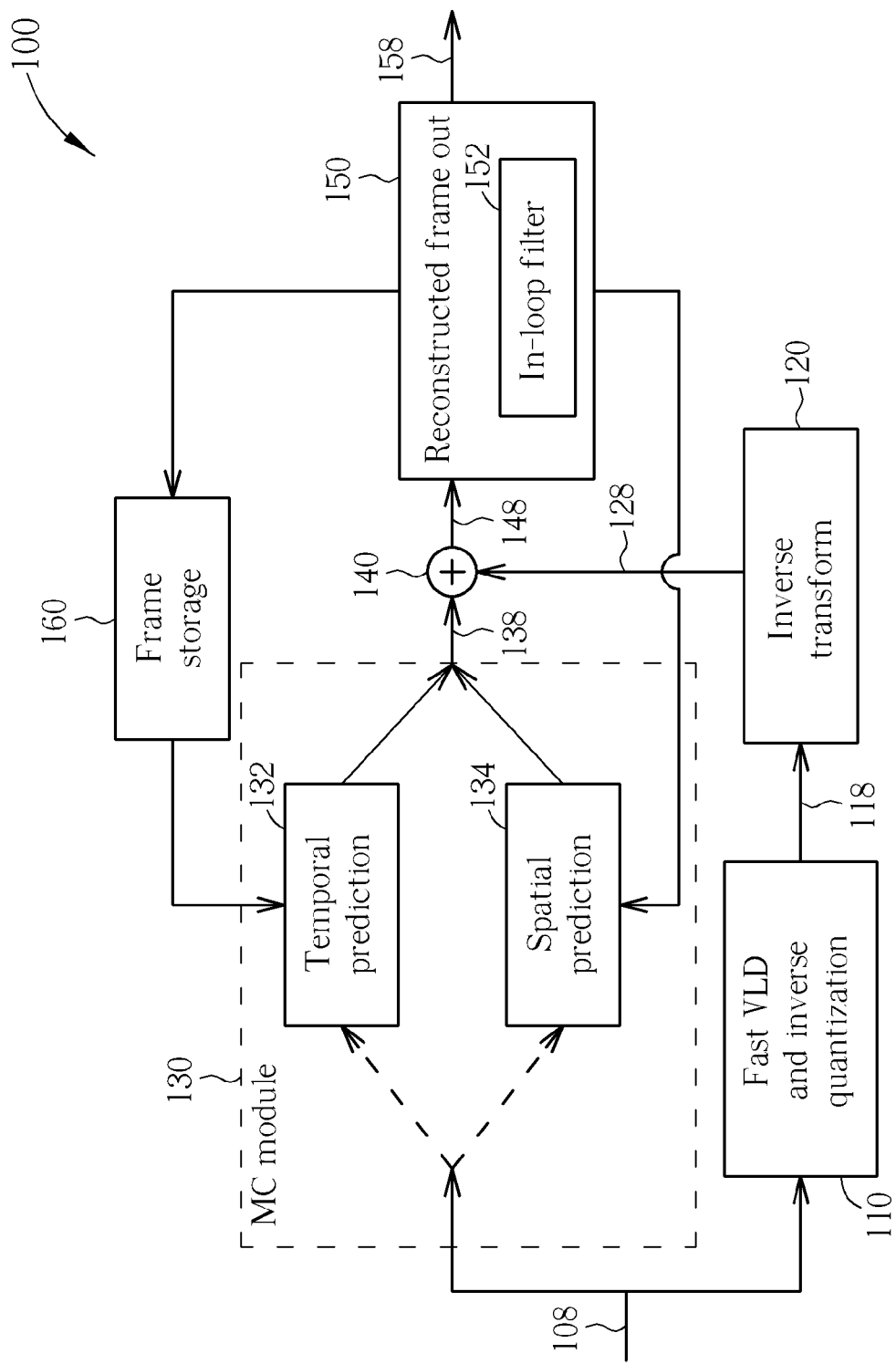
FIG. 1 is a diagram of a low complexity video decoder according to a first embodiment of the present invention.

Please refer to FIG. 1, which illustrates a low complexity video decoder 100 according to a first embodiment of the present invention. The low complexity video decoder 100 comprises a fast variable length decoding (VLD) and inverse quantization module 110 (labeled "Fast VLD and inverse quantization" in FIG. 1), an inverse transform unit 120 (labeled "Inverse transform" in FIG. 1) such as an inverse discrete cosine transform (IDCT) unit, a motion compensation module 130 (labeled "MC module" in FIG. 1) comprising a temporal prediction unit 132 (labeled "Temporal prediction" in FIG. 1) and a spatial prediction unit 134 (labeled "Spatial prediction" in FIG. 1), an arithmetic unit 140 such as an adder, a reconstructed frame output unit 150 (labeled "Reconstructed frame out" in FIG. 1) comprising a de-blocking filter such as an in-loop filter 152, and a frame storage 160 such as a frame buffer. In particular, the de-blocking filter such as the in-loop filter 152 is a low complexity de-blocking filter. Please note that the temporal prediction unit 132 and the spatial prediction unit 134 can be referred to as the inter prediction unit and the intra prediction unit, respectively.

According to this embodiment, the fast VLD and inverse quantization module 110 is arranged to perform fast VLD and inverse quantization on an input bit stream 108 to generate inverse quantization results 118, and the inverse transform unit 120 is arranged to perform inverse transform on the inverse quantization results 118 to generate inverse transform results 128. In addition, the motion compensation module 130 is arranged to perform motion compensation according to the input bit stream 108 and generate associated prediction outputs 138, where the temporal prediction unit 132 is arranged to perform temporal prediction and the spatial prediction unit 134 is arranged to perform spatial prediction. As shown in FIG. 1, the arithmetic unit 140 is arranged to sum up the inverse transform results 128 and the prediction outputs 138 to generate reconstructed outputs 148, and the reconstructed frame output unit 150 is arranged to generate a plurality of reconstructed frames 158, where the spatial prediction unit 134 performs the spatial prediction according to reconstructed data output from the reconstructed frame output unit 150, and the resolution of the reconstructed frames 158 is typically less than the resolution of a plurality of original frames represented by the input bit stream 108. In addition, the frame storage 160 is arranged to temporarily store at least one portion of the reconstructed frames 158, where the temporal prediction unit 132 performs the temporal prediction according to the aforementioned at least one portion of the reconstructed frames 158.

In particular, at least one portion of the low complexity video decoder 100, such as the temporal prediction unit 132, the spatial prediction unit 134, the inverse transform unit 120, the reconstructed frame output unit 150, and/or the fast VLD and inverse quantization module 110, may operate in accordance with the resolution of the reconstructed frames 158, rather than the resolution of the original frames represented by the input bit stream 108, in order to reduce complexity of decoding operations. The reduced resolution frame can be achieved by down sampling the frame, for example, by selecting particular pixels to represent each block of the frame, such as selecting the bottom right pixels of each 2 by 2 pixels. In an embodiment, the temporal prediction unit 132 operates in accordance with the resolution of the reconstructed frames 158, rather than the resolution of the original frames, in order to reduce complexity of temporal prediction. For example, the temporal prediction unit 132 further estimates at least a portion of partial information that has been omitted, in order to perform half pixel or quarter pixel interpolation for use of performing the temporal prediction. In addition, the spatial prediction unit 134 operates in accordance with the resolution of the reconstructed frames 158, rather than the resolution of the original frames, in order to reduce complexity of spatial prediction. For example, the spatial prediction unit 134 further estimates at least a portion of partial information that has been omitted, in order to perform half pixel or quarter pixel interpolation for use of performing the spatial prediction. According to this embodiment, the inverse transform unit 120 operates in accordance with the resolution of the reconstructed frames 158, rather than the resolution of the original frames, in order to reduce complexity of inverse transform. For example, the inverse transform unit 120 omits a portion of calculations of the inverse transform by selecting one of a plurality of predetermined inverse transform functions $F_{IT}$ for use of the inverse transform. In addition, the reconstructed frame output unit 150 operates in accordance with the resolution of the reconstructed frames 158, rather than the resolution of the original frames, in order to reduce complexity of generating the reconstructed frames. For example, the in-loop filter 152 performs in-loop filtering for use of de-blocking. Additionally, the fast VLD and inverse quantization module 110 operates in accordance with the resolution of the reconstructed frames 158, rather than the resolution of the original frames, in order to reduce complexity of performing fast VLD and inverse quantization. More particularly, the fast VLD and inverse quantization module 110 utilizes a lookup table comprising a main table and at least one sub-table (e.g. one or more sub-tables) during decoding, where the probability of utilizing the main table is greater than that of the at least one sub-table due to a predetermined arrangement of the lookup table in a design phase of the low complexity video decoder 100.

According to some variations of this embodiment, at least a portion of the low complexity video decoder 100 can omit partial information being processed by the portion of the low complexity video decoder 100, in order to reduce complexity of decoding the input bit stream 108.

Figure 2:
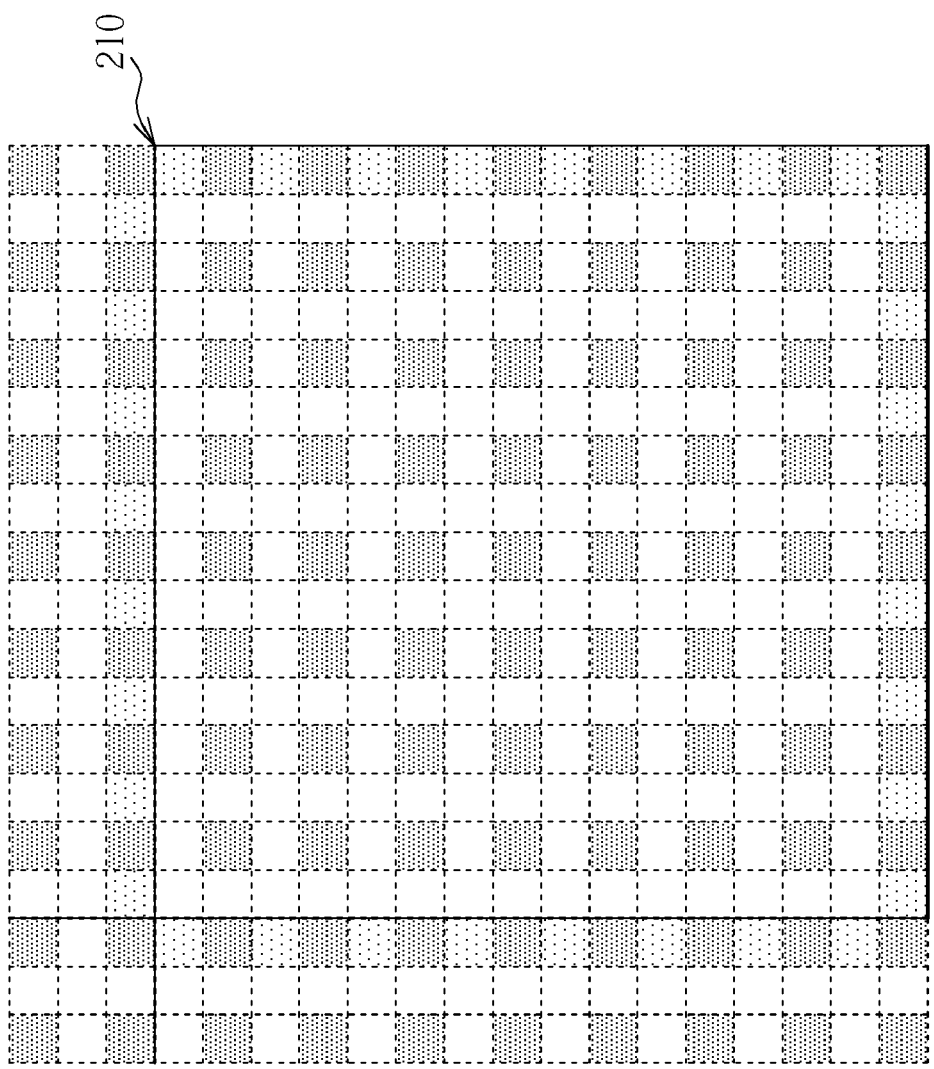
FIG. 2 illustrates a down sampling scheme involved with the low complexity video decoder shown in FIG. 1 according to an embodiment of the present invention.

FIG. 2 illustrates a down sampling scheme involved with the low complexity video decoder 100 shown in FIG. 1 according to an embodiment of the present invention. Suppose that W represents an integer that is greater than one. For every W by W pixels of an original frame, the low complexity video decoder 100 selects at least the bottom right pixel of the W by W pixels, rather than a mean value of pixel values of the W by W pixels. In a situation where W=2, such as that shown in FIG. 2, for every 2 by 2 pixels of the original frame, the low complexity video decoder 100 selects the pixel value of the bottom right pixel of the 2 by 2 pixels, rather than the mean value of the pixel values of the 2 by 2 pixels. The heavily shaded pixels shown in FIG. 2 are taken as examples of the bottom right pixel mentioned above.

In some embodiments, the low complexity video decoder 100 further stores pixel values of all boundary pixels of a bottom boundary and a right boundary within a current macroblock such as the macroblock 210, and stores pixel values of all boundary pixels of a bottom boundary within an upper macroblock (e.g. the upper adjacent macroblock of the macroblock 210) and pixel values of all boundary pixels of a right boundary within a left macroblock (e.g. the left adjacent macroblock of the macroblock 210), for use of intra prediction. Thus, in addition to the bottom right pixel of every W by W pixels, the low complexity video decoder 100 further keeps the pixel values of additional pixels of some boundaries, such as those of the lightly shaded pixels shown in FIG. 2, for use of intra prediction.

In particular, the low complexity video decoder 100 may temporarily discard some pixel values of the boundary pixels for reducing the complicity of operations, and may recover the discarded pixel values later. In this manner, the low complexity video decoder 100 stores the recovered pixel values, rather than the pixel values that have been discarded.

Figure 3A:
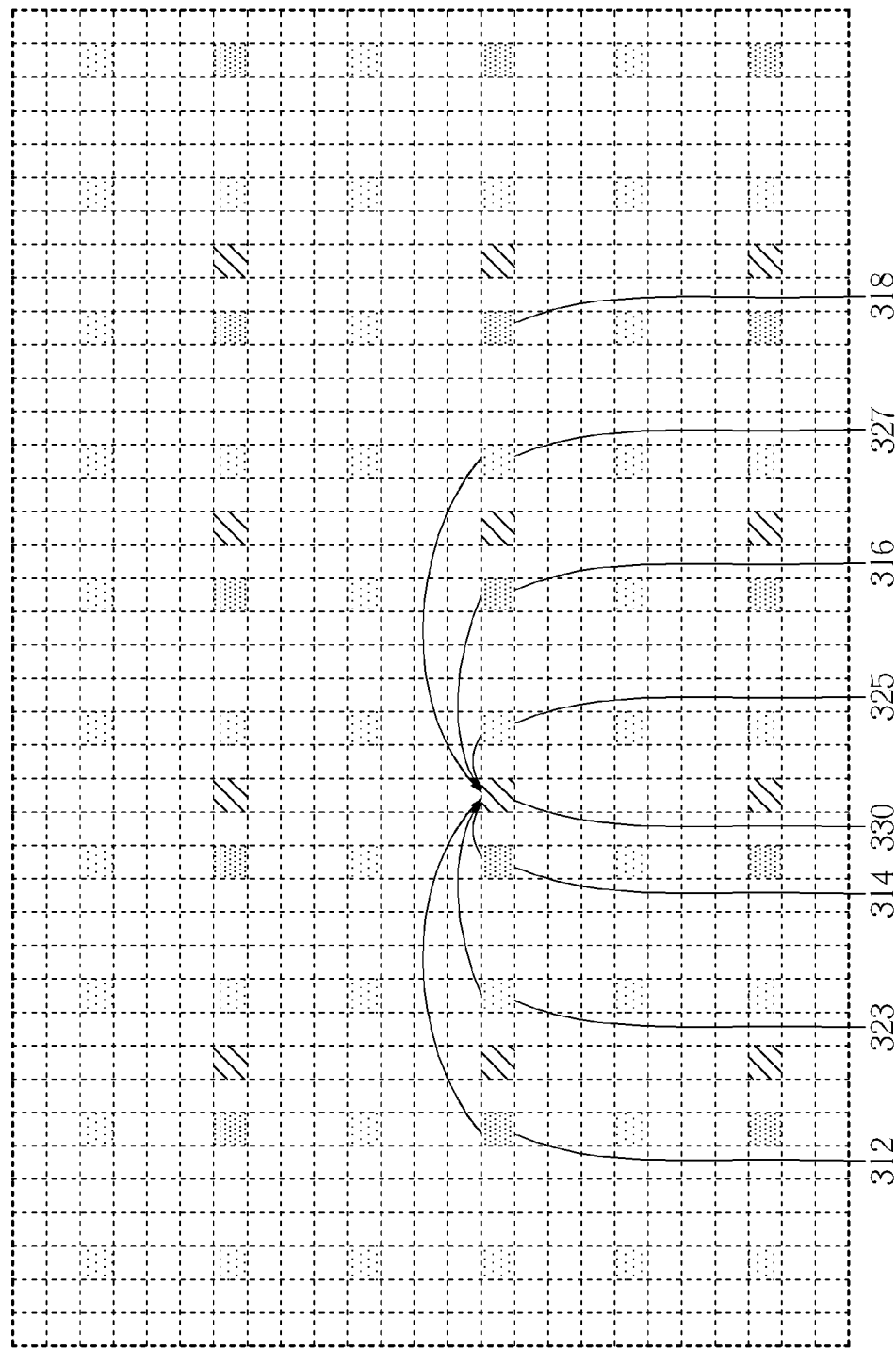
FIGS. 3A-3B respectively illustrate half pixel interpolation and quarter pixel interpolation involved with low complexity motion compensation of the motion compensation (MC) module shown in FIG. 1 according to an embodiment of the present invention.
Figure 3B:
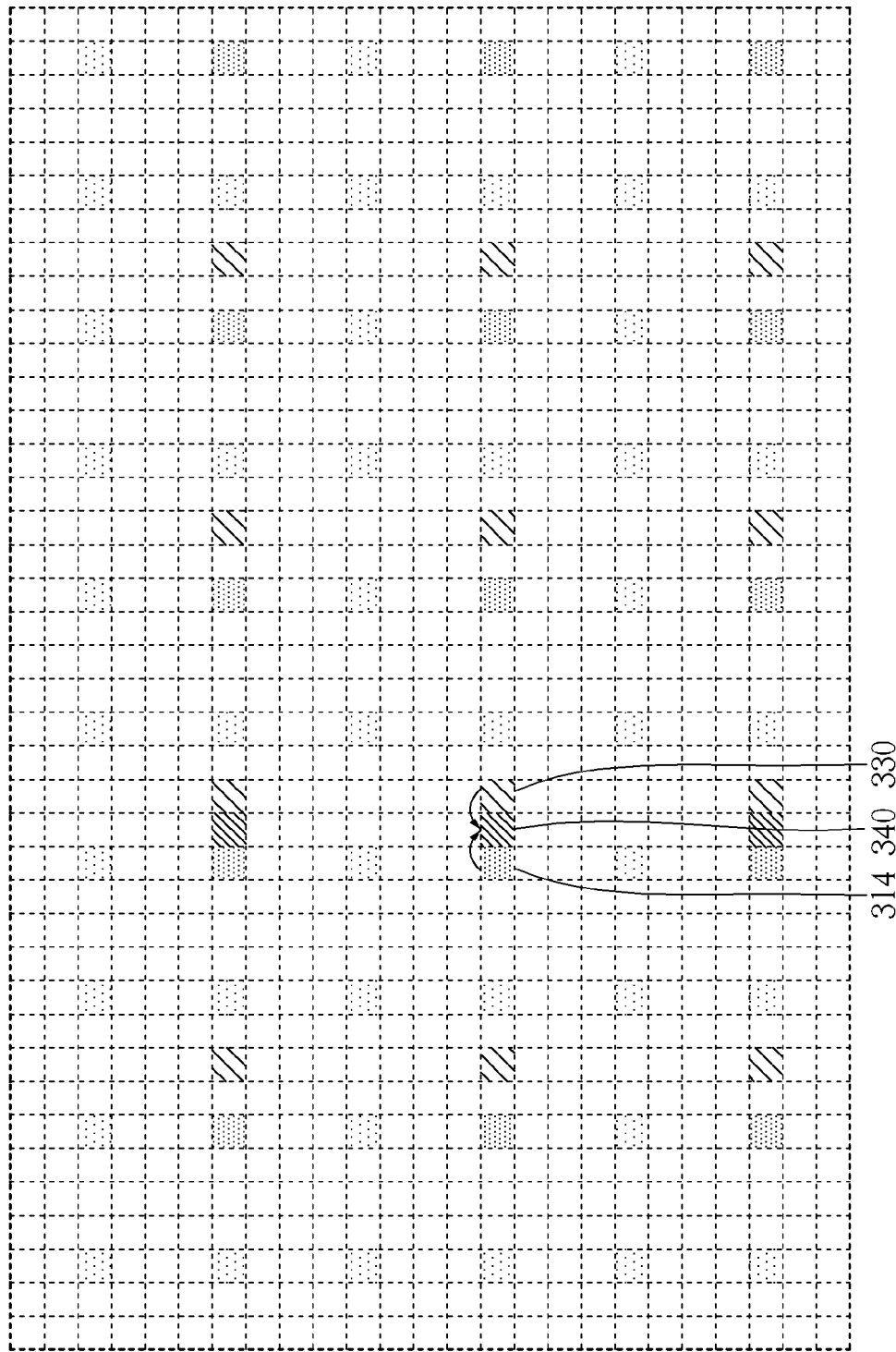

FIGS. 3A-3B respectively illustrate half pixel interpolation and quarter pixel interpolation involved with low complexity motion compensation of the motion compensation module 130 shown in FIG. 1 according to an embodiment of the present invention.

The heavily shaded pixels 312, 314, 316, and 318 are taken as examples of the heavily shaded pixels shown in FIG. 2, while the lightly shaded pixels 323, 325, and 327 are taken as examples of the non-shaded pixels shown in FIG. 2. As the pixel values of the non-shaded pixels shown in FIG. 2, have been discarded, the motion compensation module 130 can interpolate the pixel values of at least a portion of the non-shaded pixels shown in FIG. 2 (e.g. the lightly shaded pixels 323, 325, and 327 shown in FIG. 3A) according to the pixel values of at least a portion of the heavily shaded pixels shown in FIG. 2 (e.g. the heavily shaded pixels 312, 314, 316, and 318) when needed. As shown in FIG. 3A, after recovering the pixel values of the lightly shaded pixels 323, 325, and 327, the motion compensation module 130 can perform half pixel interpolation according to the pixel values of the shaded pixels 312, 314, 316, 323, 325, and 327 to generate the pixel value of the pixel 330. As shown in FIG. 3B, after obtaining the pixel value of the pixel 330 the motion compensation module 130 can further perform quarter pixel interpolation according to the pixel values of the pixels 314 and 330. Therefore, after obtaining all information needed, the motion compensation module 130 can calculate a motion vector in an up sampling domain, for use of motion compensation.

In practice, the motion compensation module 130 can utilize a 6-tap filter to perform the recovering operations for up-sampling at least a portion of discarded pixels such as the non-shaded pixels shown in FIG. 2) in an up sampling manner. The motion compensation module 130 can also perform the half pixel interpolation by utilizing the same or another 6-tap filter. In addition, the motion compensation module 130 can utilize a bilinear filter to perform the quarter pixel interpolation. In particular, the filters of the architecture disclosed above can be implemented as an 8-tap filter. This is for illustrative purposes only, and is not meant to be a limitation of the present invention. According to a variation of this embodiment, the 8-tap filter can be replaced by a 4-tap filter to further reduce the complicity of the low complexity video decoder 100. Please note that the half pixel interpolation and the quarter pixel interpolation mentioned above are not meant to be limitations of the present invention. According to a variation of this embodiment, sub-pixel interpolation can be applied to the architecture disclosed above.

Figure 4:
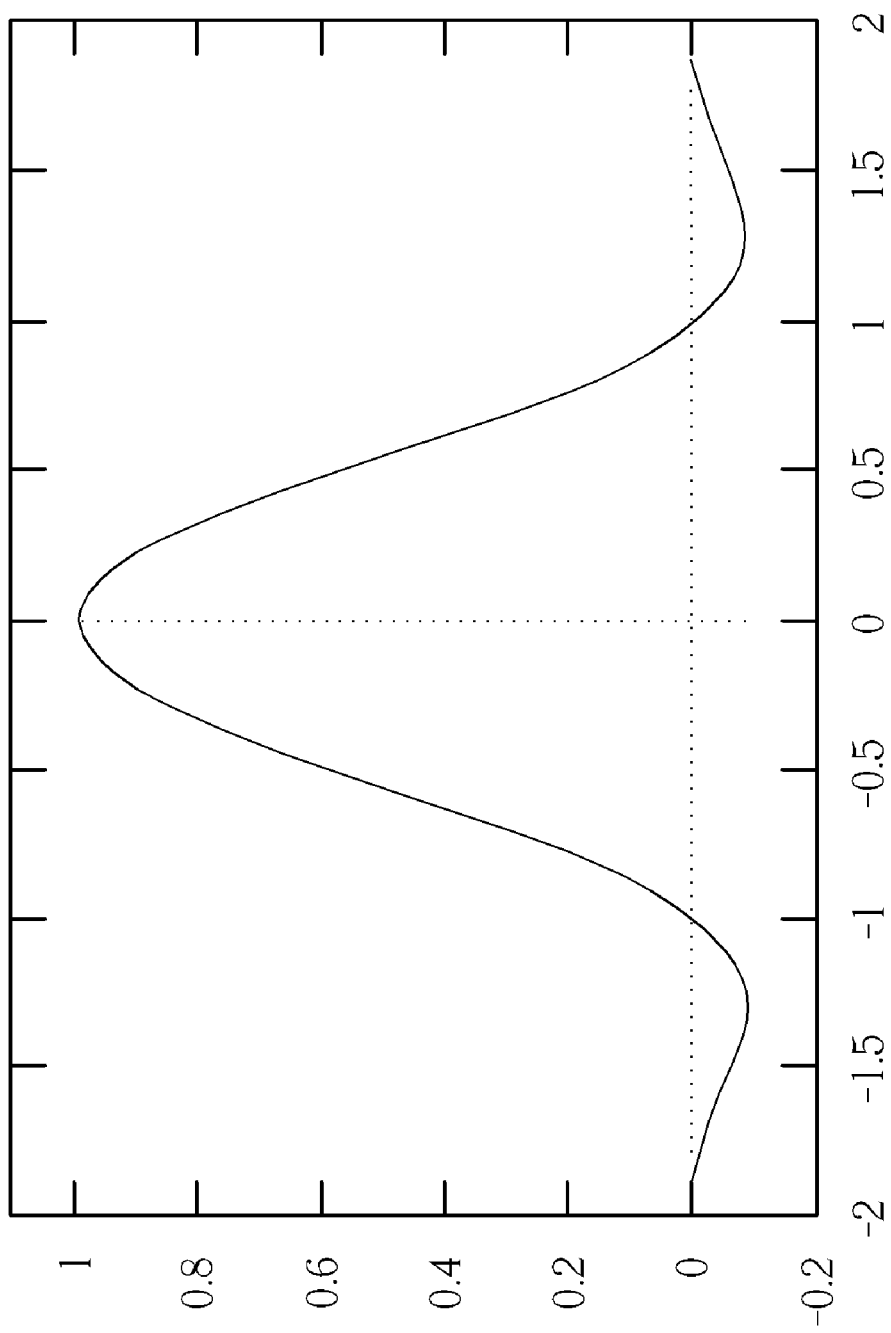
FIG. 4 illustrates a curve of a Lanczos filter involved with the sub-pixel interpolation according to an embodiment of the present invention.

FIG. 4 illustrates a curve of a Lanczos filter involved with the sub-pixel interpolation according to an embodiment of the present invention. Given that the notation $a_0$ represents a real value that is greater than zero, in a situation where $-a_0 < x < a_0$ and x is not equal to 0, the Lanczos kernel can be expressed as follows:

$$L(x) = \sin c(x) * \sin c(x/a_0);$$

where $\sin c(x) = \sin(x)/(\pi * x)$ with the notation $\pi$ representing the ratio of the circumference of a circle to its diameter.

In addition, $L(x)=1$ when $x=0$. Please note that in a situation where the absolute value of the value x is greater than or equal to the parameter $a_0$, $L(x)$ is equal to zero.

FIGS. 5A-5B illustrate some calculations involved with low complexity inverse transform of the inverse transform unit 120 shown in FIG. 1 according to different embodiments of the present invention, and more particularly, variations of the embodiment shown in FIG. 2, where the calculations shown in FIG. 5B are utilized in the low complexity inverse transform for an intra block.

Please refer to FIG. 5A. The matrix comprising the DCT coefficients $c_{00}, c_{01}, \ldots,$ and $c_{33}$ is a 4 by 4 DCT coefficient matrix, while the other two matrixes shown in the upper half of FIG. 5A comprise a DCT bases matrix and a transpose of the DCT bases matrix. In the lower half of FIG. 5A, the matrix comprising intermediate values $p_{00}, p_{01}, \ldots,$ and $p_{33}$ can be referred to as an intermediate matrix, and the bottom right matrix comprising the calculation results $r_{00}, r_{01}, \ldots,$ and $r_{33}$ can be referred to as a resultant matrix. Suppose that a portion of the calculation results, such as the calculation results 532, 534, 542, 544, 546, and 548, carry the information of the discarded pixels. Thus, rows 512 and 514 in the DCT bases matrix and the intermediate values 522 and 524 can be discarded in this embodiment.

Referring to FIG. 5B, the aforementioned DCT coefficient matrix comprising the DCT coefficients $c_{00}, c_{01}, \ldots,$ and $c_{33}$ is replaced by another DCT coefficient matrix comprising the DCT coefficients $I_{00}, I_{01}, \ldots,$ and $I_{33}$, for use of the intra block, where the bottom right matrix comprising the calculation results $r'_{00}, r'_{01}, \ldots,$ and $r'_{33}$ can be referred to as a resultant matrix. Similarly, suppose that a portion of the calculation results, such as the calculation results 582, 584, 592, and 594, carry the information of the discarded pixels. In this embodiment, pixels in the right and bottom boundary are retained for intra prediction. Please note that associated values within the other two matrixes shown in the lower half of FIG. 5B can be discarded in a similar way.

The reduced complexity inverse transform methods proposed above eliminate some calculations by analyzing the output (e.g. The resultant matrix), and if a pixel is to be dropped later, corresponding calculations can be eliminated or corresponding values can be discarded. The reduced complexity inverse transform methods proposed below skip or drop the pixels by analyzing and classifying the input pixels, and please refer to FIGS. 6A-6B for more details.

Figure 6A:
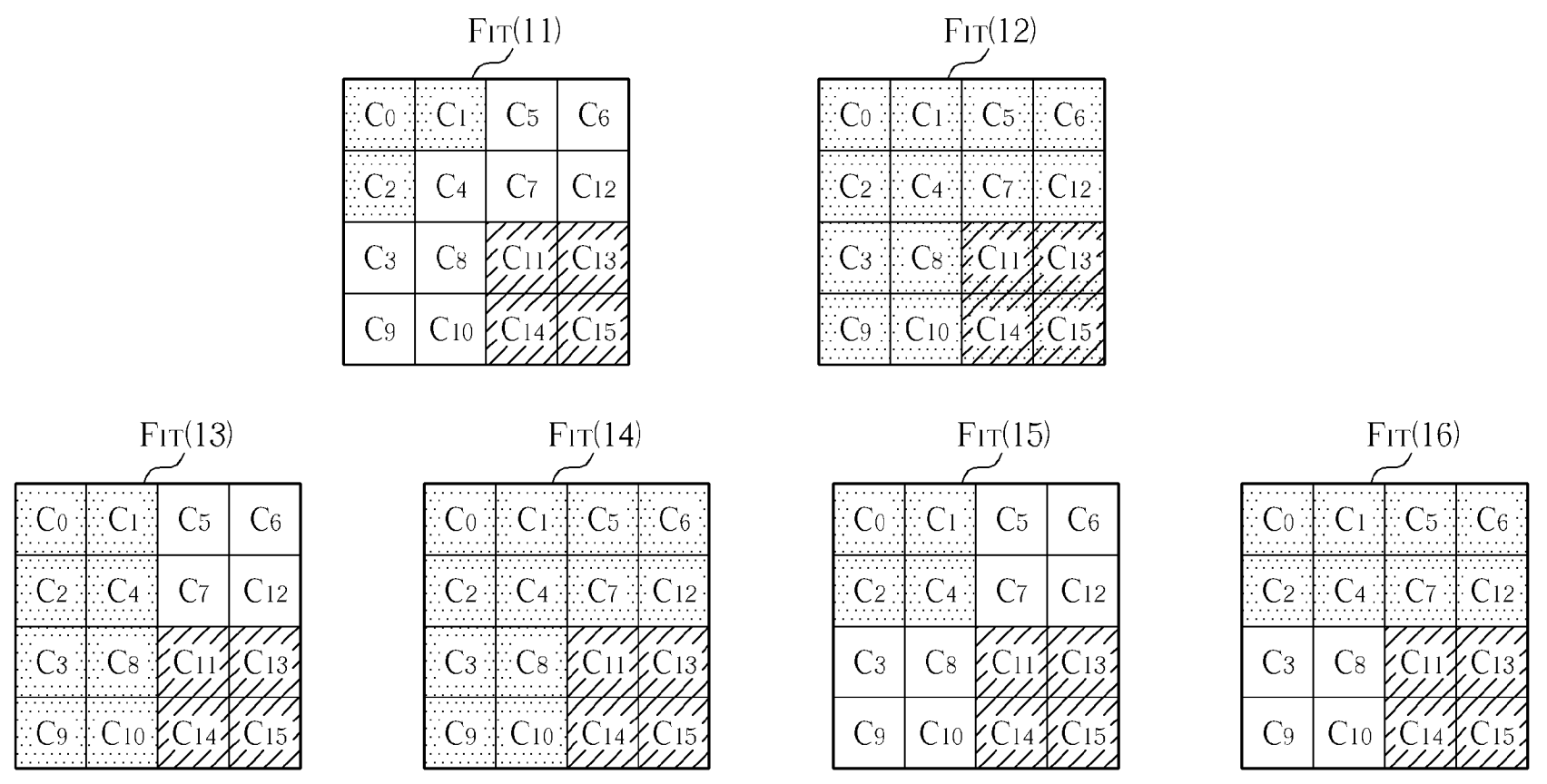
Figure 6B:
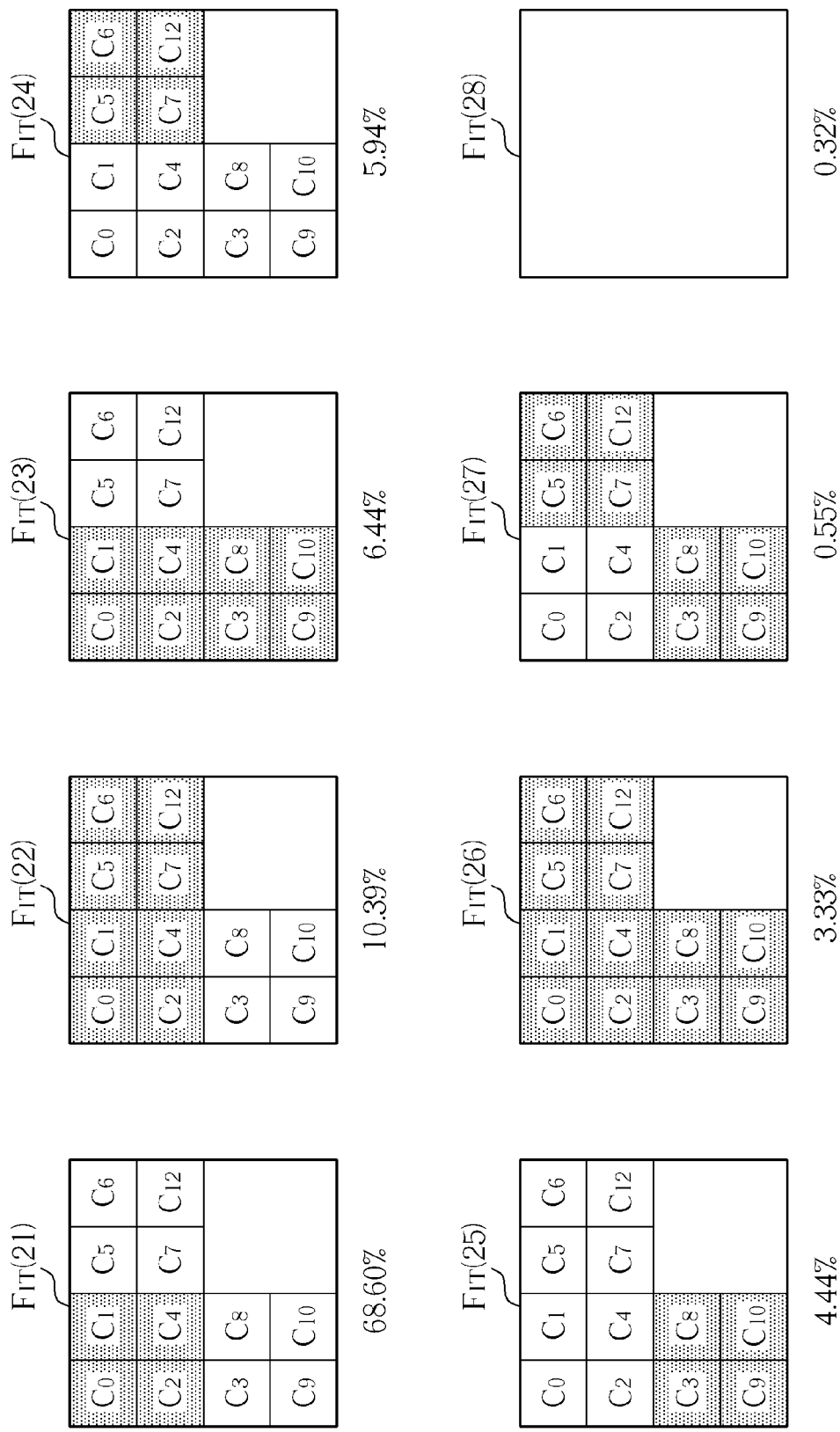

FIGS. 6A-6B illustrate some inverse transform functions $\{F_{IT}(11), F_{IT}(12), \ldots, F_{IT}(16)\}$ and $\{F_{IT}(21), F_{IT}(22), \ldots, F_{IT}(28)\}$ involved with the low complexity inverse transform of the inverse transform unit 120 shown in FIG. 1 according to different embodiments of the present invention.

In practice, the inverse transform unit 120 can utilize a Coded Block Pattern (CBP) descriptor to skip zero blocks. For example, some coefficients such as $C_5$, $C_6$, $C_7$ and $C_{12}$ in the inverse transform function $F_{IT}(13)$ are zero, and thus can be skipped. In addition, the inverse transform unit 120 may drop some coefficients in a specific inverse transform function of the inverse transform functions $\{F_{IT}(11), F_{IT}(12), \ldots, F_{IT}(16)\}$, such as the high frequency coefficients $C_{11}$, $C_{12}$, ..., and $C_{15}$ in some of the inverse transform functions $\{F_{IT}(11), F_{IT}(12), \ldots, F_{IT}(16)\}$. For example, in the embodiment shown in FIG. 6A, the inverse transform unit 120 may select the specific inverse transform function from the inverse transform functions $F_{IT}(11)$, $F_{IT}(12)$, ..., and $F_{IT}(16)$ by utilizing table lookup.

Please note that FIG. 6B further illustrates the statistics of experiments conducted to analyze and classify the input pixels, where the statistical data 68.60%, 10.39%, 6.44%, 5.94%, 4.44%, 3.33%, 0.55%, and 0.32% correspond to the inverse transform functions $F_{IT}(21)$, $F_{IT}(22)$, $F_{IT}(23)$, $F_{IT}(24)$, $F_{IT}(25)$, $F_{IT}(26)$, $F_{IT}(27)$, and $F_{IT}(28)$, respectively. For example, $F_{IT}(21)$ is the most common inverse transform function, where 68.60% of the time, the input pixels are best fit into this inverse transform function with only low frequency coefficients (e.g. $C_0$, $C_1$, $C_2$, $C_4$) remained. The high frequency coefficients of $F_{IT}(21)$ are dropped and the rest coefficients are zero and thus skipped.

Please refer to FIG. 6A. In this embodiment, the inverse transform unit 120 can be intentionally arranged to omit at least one portion (e.g. an omitted portion) of each of one or more inverse transform functions, such as the bottom right quarter of each of the inverse transform functions $F_{IT}(11)$, $F_{IT}(12)$, ..., and $F_{IT}(16)$. That is, during the calculations of the low complexity inverse transform of the inverse transform unit 120, a portion of the calculations, such as those corresponding to the bottom right quarter of each of the inverse transform functions $F_{IT}(11)$, $F_{IT}(12)$, ..., and $F_{IT}(16)$, can be intentionally omitted. Thus, it is unnecessary to set each of the coefficients in the bottom right quarter in advance. For example, the inverse transform unit 120 does not set each of the coefficients in the bottom right quarter in advance. In another example, the inverse transform unit 120 may set each of the coefficients in the bottom right quarter as an arbitrary value in advance. In addition, the coefficients in the other portions (e.g. the other quarters) of each of the inverse transform functions $F_{IT}(11)$, $F_{IT}(12)$, ..., and $F_{IT}(16)$ may be arranged to have their respective values in advance. According to this embodiment, the dotted portions of the inverse transform functions $F_{IT}(11)$, $F_{IT}(12)$, ..., and $F_{IT}(16)$ represent respective masks that can be applied to the coefficients. After applying the respective masks, the coefficients within the dotted portions are kept for further calculations of the low complexity inverse transform of the inverse transform unit 120, and the coefficients within the non-dotted portions are set as zero. Similar descriptions are not repeated for this embodiment.

Referring to FIG. 6B, in a situation where the bottom right quarters of the inverse transform functions $F_{IT}(21)$, $F_{IT}(22)$, ..., and $F_{IT}(28)$ are omitted (and therefore can be illustrated with blank), the inverse transform unit 120 can selectively utilize one of the inverse transform functions $F_{IT}(21)$, $F_{IT}(22)$, ..., and $F_{IT}(28)$ at a time base upon whether the quarters are zero or non-zero, where the respective probabilities of utilizing the inverse transform functions $F_{IT}(21)$, $F_{IT}(22)$, ..., and $F_{IT}(28)$ are illustrated below the respective inverse transform functions. For example, the inverse transform functions $F_{IT}(21)$ has a non-zero quarter such as the upper left quarter, the inverse transform functions $F_{IT}(22)$ has two non-zero quarters such as the upper left and upper right quarters, the inverse transform functions $F_{IT}(23)$ has two non-zero quarters such as the upper left and bottom left quarters, the inverse transform functions $F_{IT}(24)$ has a non-zero quarter such as the upper right quarter, the inverse transform functions $F_{IT}(25)$ has a non-zero quarter such as the bottom left quarter, the inverse transform functions $F_{IT}(26)$ has three non-zero quarters (i.e. the quarters except for the bottom right quarter), and the inverse transform functions $F_{IT}(27)$ has two non-zero quarters such as the bottom left and upper right quarters. Please note that the bottom left, the upper left, and the upper right quarters of the inverse transform functions $F_{IT}(28)$ are zero quarters, so the hole of the inverse transform functions $F_{IT}(28)$ is simply illustrated with blank. Similar descriptions are not repeated for this embodiment.

Figure 7:
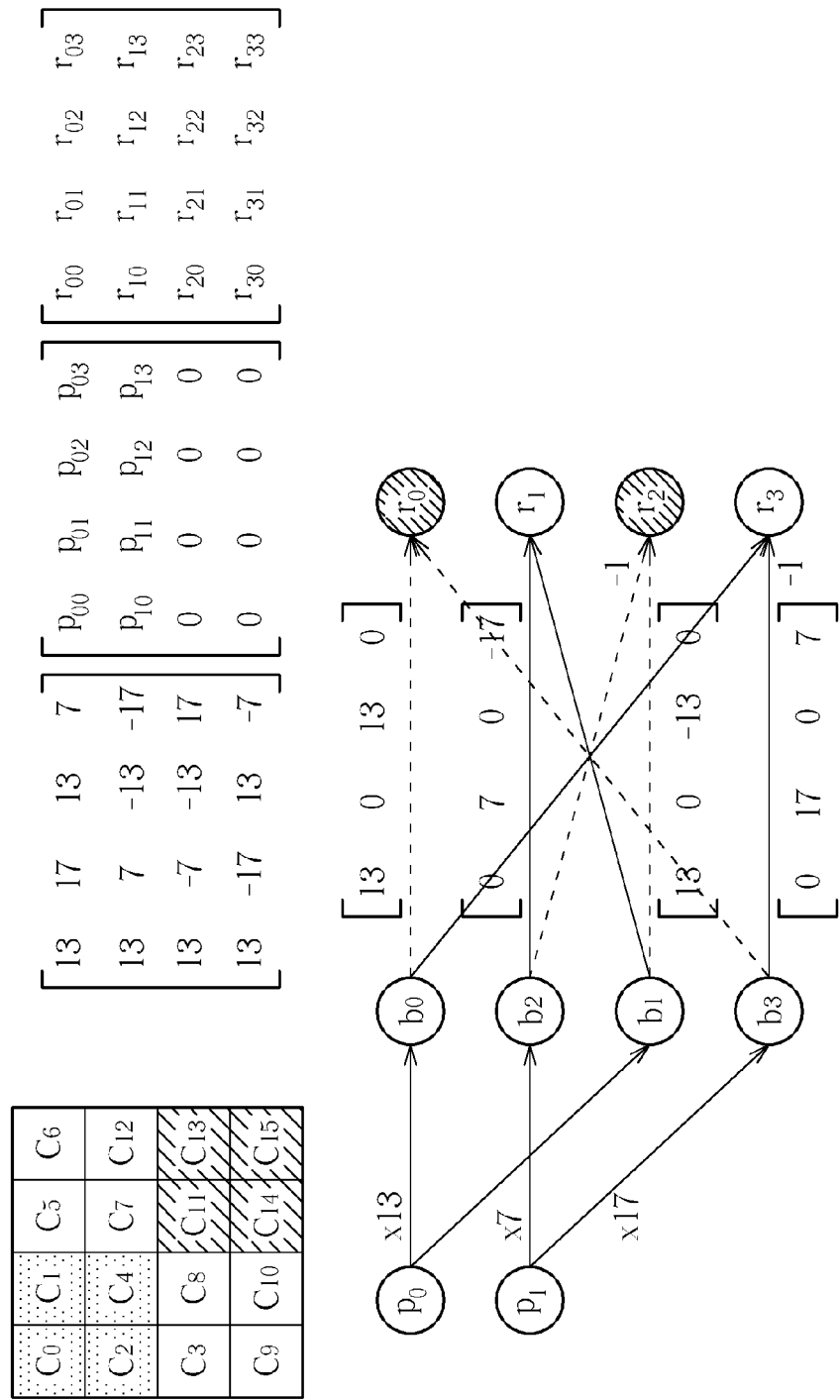
FIG. 7 illustrates some implementation details of the low complexity inverse transform of the inverse transform unit shown in FIG. 1 according to an embodiment of the present invention.

FIG. 7 illustrates some implementation details of the low complexity inverse transform of the inverse transform unit 120 shown in FIG. 1 according to an embodiment of the present invention. Suppose that some of the intermediate values $p_{00}$, $p_{01}$, ..., and $p_{33}$ mentioned above, such as those of the lower half of the intermediate matrix shown in FIG. 5A (i.e. the intermediate values $p_{20}$, $p_{21}$, ..., and $p_{33}$), are zero for the purpose of reducing the complexity of the inverse transform of the inverse transform unit 120. Given that the notations p0, p1, p2, and p3 respectively represent the four rows of intermediate values in the intermediate matrix, as the last two rows of intermediate values (i.e. the intermediate values $p_{20}$, $p_{21}$, ..., and $p_{33}$) are zero in this embodiment, p2 and p3 and their associated calculation paths are not illustrated in the calculation scheme shown in the lower half of FIG. 7.

As shown in FIG. 7, respective simplified versions [13, 0, 13, 0], [0, 7, 0, −17], [13, 0, −13, 0], and [0, −17, 0, −7] of the DCT bases matrix rows [13, 17, 13, 7], [13, 7, −13, −17], [13, −7, −13, 17], and [13, −17, 13, −7] of the aforementioned DCT bases matrix are utilized on some calculation paths in the calculation scheme shown in the lower half of FIG. 7, where the notations b0, b1, b2, and b3 respectively represent the temporal values, and the notations r0, r1, r2, and r3 respectively represent the four rows of calculation results $r_{00}$, $r_{01}$, ..., and $r_{33}$ within the resultant matrix. Please note that the calculation paths illustrated with dashed lines correspond to the calculations for generating the calculation results r0 and r2, i.e. the first and the third rows of the calculation results $r_{00}$, $r_{01}$, ..., and $r_{33}$. According to the calculation scheme shown in the lower half of FIG. 7, the number of adders for obtaining each of the calculation results r0, r1, r2, and r3 is equal to one, and the averaged number of multipliers for obtaining the calculation results r1 and r3 is equal to one and a half. As a result, the total number of adders and the total number of multipliers required in the calculation scheme shown in the lower half of FIG. 7 are two and three, respectively. Similar descriptions are not repeated for this embodiment.

Figure 8:
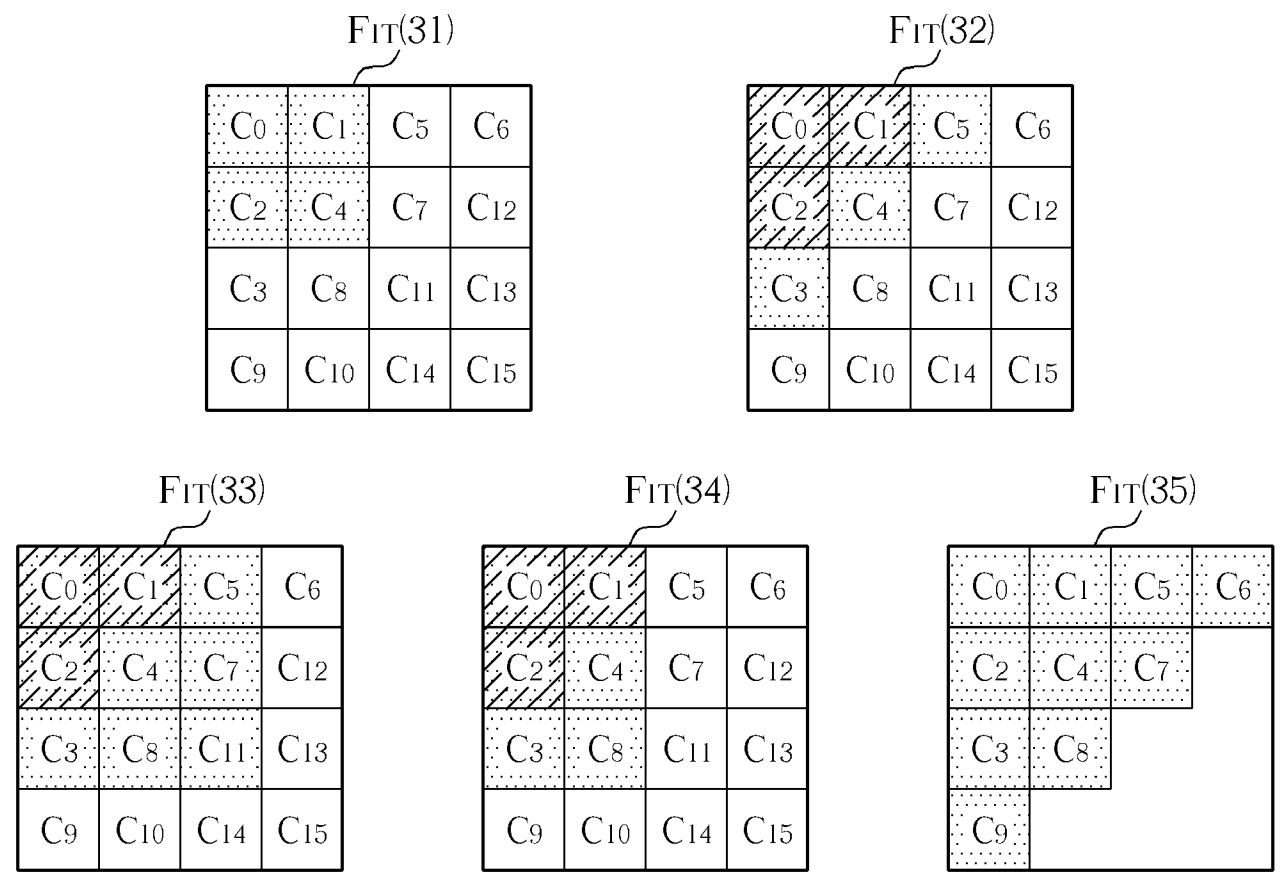

FIG. 8 illustrates some inverse transform functions $F_{IT}(31)$, $F_{IT}(32)$, ..., and $F_{IT}(35)$ involved with the low complexity inverse transform of the inverse transform unit 120 shown in FIG. 1 according to an embodiment of the present invention. According to this embodiment, the coefficients in the dotted and/or shaded portions in the inverse transform functions $F_{IT}(31)$, $F_{IT}(32)$, ..., and $F_{IT}(35)$ may illustrate various sets of masks that can be applied to the coefficients. After applying the respective masks, the coefficients within the dotted portions or the shaded portions are kept for further calculations of the low complexity inverse transform of the inverse transform unit 120, where the coefficients within the non-dotted and non-shaded portions in the respective sets of masks can be set as zero or can be ignored.

In addition, the inverse transform unit 120 can be intentionally arranged to omit at least one portion (e.g. an omitted portion such as that mentioned above) of each of one or more inverse transform functions, no matter whether the omitted portion is overlapped by the dotted portion of the same inverse transform function. For example, in each of the inverse transform functions $F_{IT}(32)$, $F_{IT}(33)$, and $F_{IT}(34)$, the omitted portion (e.g. the portion comprising the coefficients $C_0$, $C_1$, and $C_2$) is overlapped by the dotted portion of the same inverse transform function. In another example, in the inverse transform function $F_{IT}(35)$, the omitted portion (e.g. the portion comprising the coefficients $C_{10}$, $C_{11}$, ..., and $C_{15}$) is not overlapped by the dotted portion of the same inverse transform function. Please note that the masks applied to the coefficients of the inverse transform functions $F_{IT}(31)$, $F_{IT}(32)$, ..., and $F_{IT}(35)$ represent different kinds of low pass filtering operations. Similar descriptions are not repeated for this embodiment.

Figure 9:
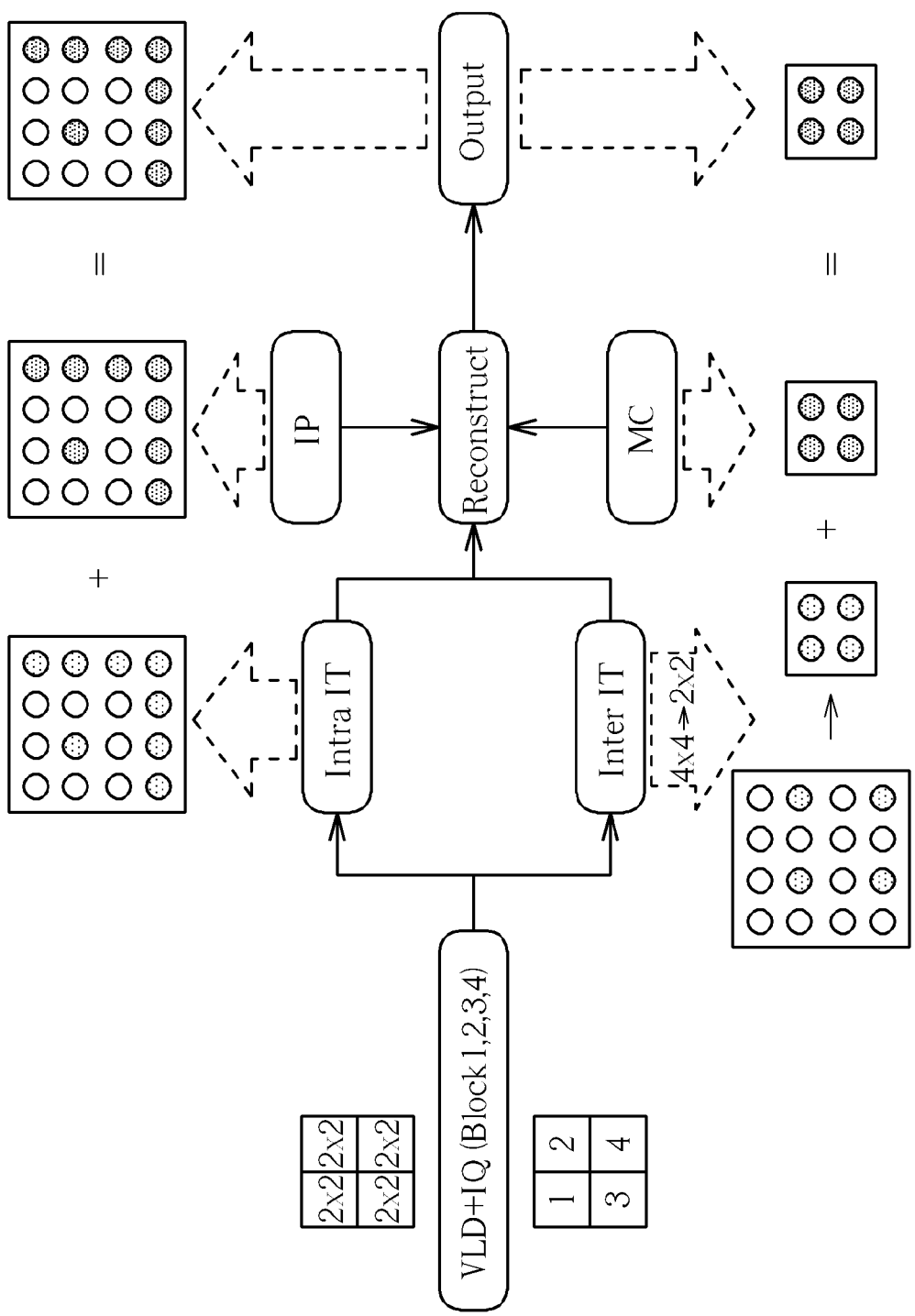
FIG. 9 illustrates a calculation scheme involved with the low complexity inverse transform of the inverse transform unit shown in FIG. 1 according to an embodiment of the present invention.

FIG. 9 illustrates a calculation scheme involved with the low complexity inverse transform of the inverse transform unit 120 shown in FIG. 1 according to an embodiment of the present invention. The inverse transform unit 120 may drop high frequency coefficients (e.g. those around the bottom right corner of an inverse transform function) to reduce the complexity of its operations, such as the inverse transform operation for intra blocks (labeled "Intra IT" on the upper calculation path of the calculation scheme shown in FIG. 9) and the inverse transform operation for non-intra blocks (labeled "Inter IT" on the lower calculation path of the calculation scheme shown in FIG. 9). In this embodiment, the inverse transform operation for the intra blocks is lossless, while the inverse transform operation for non-intra blocks is not lossless due to low pass filtering. In other embodiments, the inverse transform operation for the intra blocks can be non-lossless, and/or the inverse transform operation for non-intra blocks can be lossless.

In this embodiment, it is suggested that the fast VLD and inverse quantization module 110 shown in FIG. 1 may select a portion of the aforementioned lookup table involved with the VLD, such as the aforementioned main table or the aforementioned at least one sub-table (e.g. one or more sub-tables), according to a codeword length of a codeword. In addition, it is further suggested that VLD operations and inverse quantization operations can be integrated into merged operations (labeled "VLD+IQ (Block 1, 2, 3, 4)" around the left of the calculation scheme shown in FIG. 9), in order to reduce redundant inverse quantization operations. As only the portion of the lookup table is selected for use of table lookup corresponding to the codeword, and as the VLD operations and the inverse quantization operations are integrated into the merged operations, the performance of the fast VLD and inverse quantization module 110 can be enhanced, and therefore, operations of the other components within the low complexity video decoder 100, such as the next stage thereof (i.e. the inverse transform unit 120) will not be hindered. As shown in FIG. 9, the fast VLD and inverse quantization module 110 performs its operations in units of 2 by 2 pixels (labeled "2×2" around the upper left of the calculation scheme shown in FIG. 9), where each of the units to be processed can be regarded as a block of pixels, such as any of blocks 1, 2, 3, and 4 (labeled "Block 1, 2, 3, 4" around the bottom left of the calculation scheme shown in FIG. 9).

As shown in FIG. 9, some block representatives comprising 2 by 2 circles or 4 by 4 circles are utilized for representing image blocks associated to the respective operations and input/output information within this calculation scheme. In the block representatives, the shaded circles may represent associated pixel values under processing, or represent their adjustment values or their adjusted results. For example, the shaded circles in the block representative corresponding to the operation labeled "Intra IT" may represent the heavily shaded pixels and the boundary pixels of the bottom right block of the size of 4 by 4 pixels within the macroblock 210, and the shaded circles in the leftmost block representative corresponding to the operation labeled "Inter IT" may represent the heavily shaded pixels of another block of the size of 4 by 4 pixels within the macroblock 210. In another example, the shaded circles in the block representative corresponding to the input information labeled "IP" (which stands for intra prediction) may represent the adjustment values to be added to the pixel values under processing for the intra blocks during the reconstruction operation (labeled "Reconstruct" in FIG. 9), and the shaded circles in the block representative corresponding to the input information labeled "MC" (which stands for motion compensation) may represent the adjustment values to be added to the pixel values under processing for the non-intra blocks during the reconstruction operation. In another example, the shaded circles in the block representatives corresponding to the output information labeled "Output" may represent the adjusted results obtained from the reconstruction operation mentioned above.

In addition, the non-shaded circles may represent discarded pixel values, or represent non-existing adjustment values or non-existing adjusted results, where the non-existing adjustment values and the non-existing adjusted results are merely illustrated for better comprehension. For example, the non-shaded circles in the block representative corresponding to the operation labeled "Intra IT" may represent the non-shaded pixels of the bottom right block of the size of 4 by 4 pixels within the macroblock 210, and the non-shaded circles in the leftmost block representative corresponding to the operation labeled "Inter IT" may represent the non-shaded pixels of another block of the size of 4 by 4 pixels within the macroblock 210. In another example, the non-shaded circles in the block representative corresponding to the input information labeled "IP" may represent the non-existing adjustment values mentioned above, and the non-shaded circles in the upper right block representative that corresponds to the output information labeled "Output" may represent the non-existing adjusted results. This is for illustrative purposes only, and is not meant to be a limitation of the present invention. According to variations of this embodiment, the adjustment values and/or the adjusted results may exist.

As a result of utilizing the calculation scheme shown in FIG. 9, the complexity of operations of the low complexity video decoder 100 shown in FIG. 1 is greatly reduced.

Figure 10A:
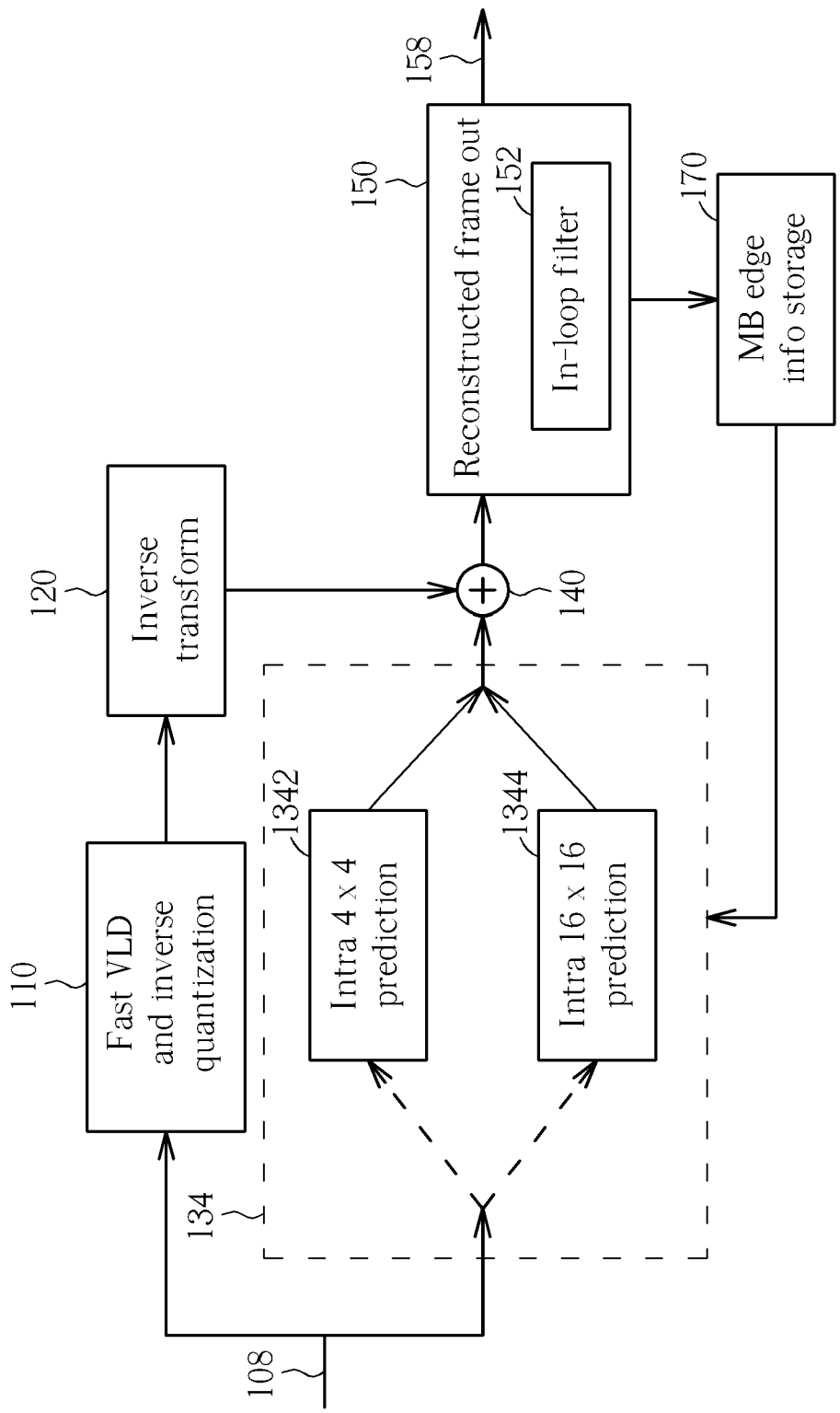
FIG. 10A illustrates a calculation scheme involved with low complexity intra prediction of the spatial prediction unit shown in FIG. 1 according to an embodiment of the present invention.

FIG. 10A illustrates a calculation scheme involved with low complexity intra prediction of the spatial prediction unit 134 shown in FIG. 1 according to an embodiment of the present invention. In this embodiment, the low complexity video decoder 100 further comprises a macroblock edge information storage 170 (labeled "MB edge info storage" in FIG. 10A) arranged to store macroblock edge information (e.g. pixel values of boundary pixels, such as those mentioned above), where the macroblock edge information can be obtained from the reconstructed frame output unit 150 (labeled "Reconstructed frame out" in FIG. 10A). This is for illustrative purposes only, and is not meant to be a limitation of the present invention. According to variations of this embodiment, the macroblock edge information storage 170 can be integrated into a component within the low complexity video decoder 100, such as the reconstructed frame output unit 150 or the spatial prediction unit 134.

According to this embodiment, with the aid of the macroblock edge information storage 170, the reconstructed frame output unit 150 can provide the spatial prediction unit 134 with all the macroblock edge information required since the discarded pixel values, such as the pixel values of the lightly shaded pixels 323, 325, and 327, can be recovered as disclosed above. As shown in FIG. 10A, the spatial prediction unit 134 comprises a first prediction sub-unit 1342 (labeled "Intra 4×4 prediction") and a second prediction sub-unit 1344 (labeled "Intra 16×16 prediction"), for use of the low complexity intra prediction.

Figure 10B:
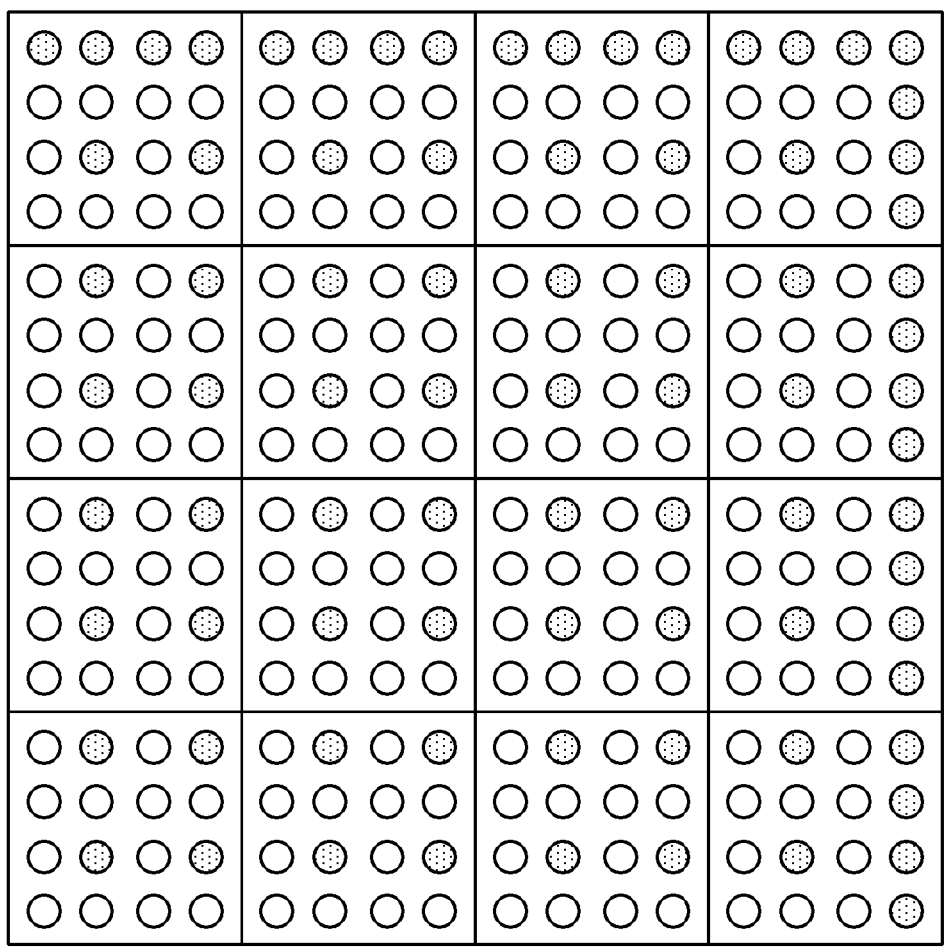
FIGS. 10B-10E illustrate some implementation details of the low complexity intra prediction of the spatial prediction unit shown in FIG. 1 according to the embodiment shown in FIG. 10A.
Figure 10C:
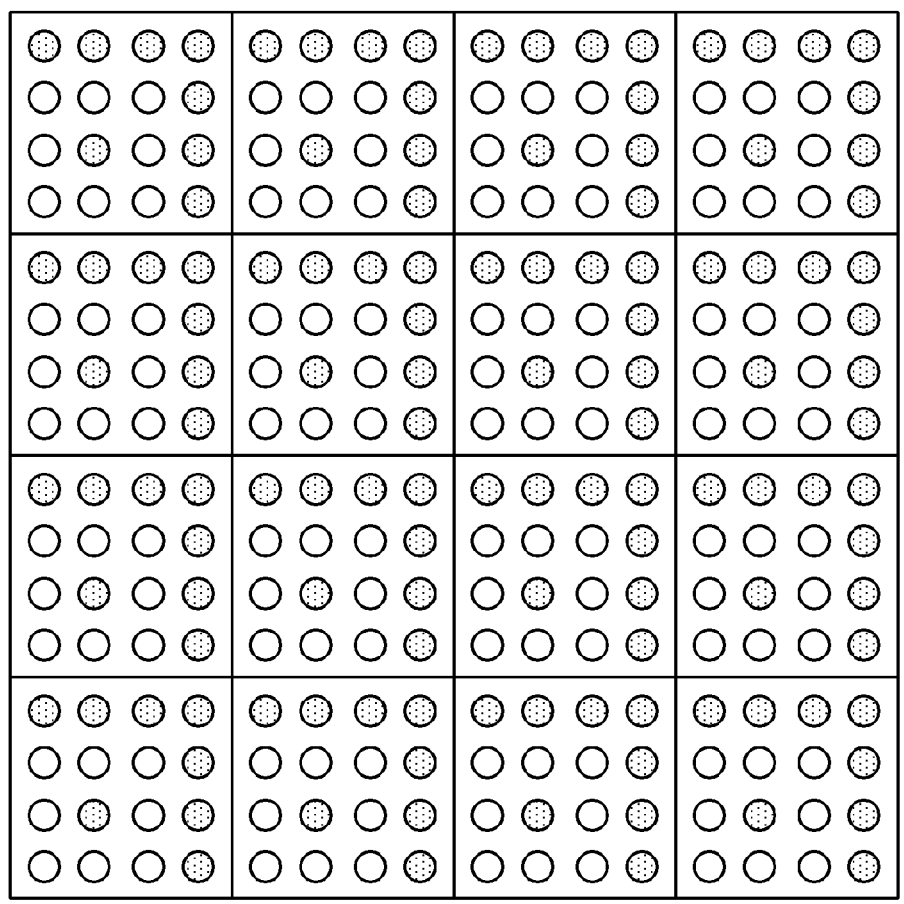
Figure 10D:
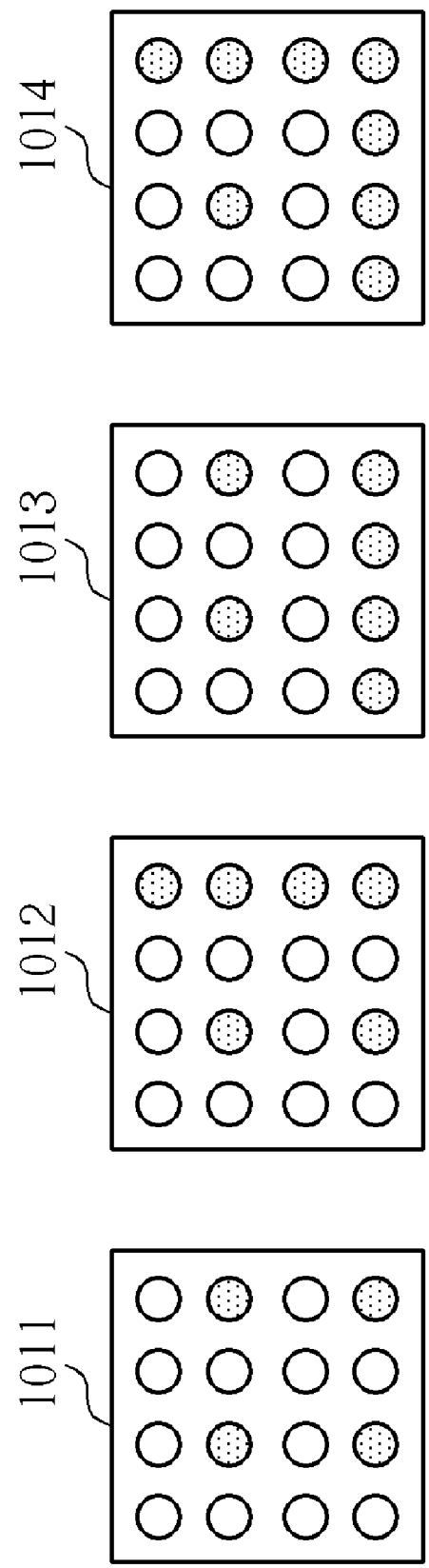
Figure 10E:
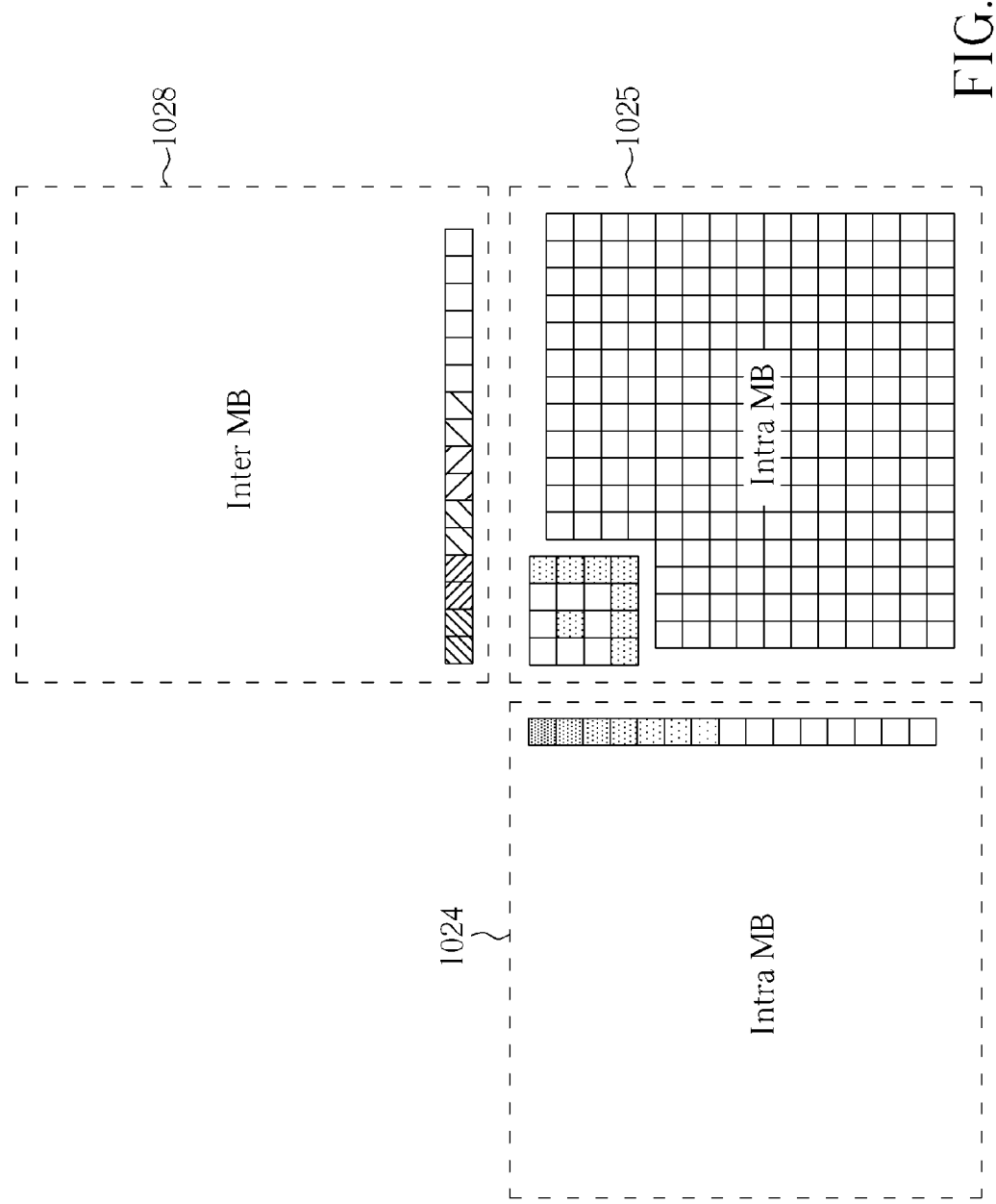

FIGS. 10B-10E further illustrate some implementation details of the low complexity intra prediction of the spatial prediction unit 134 shown in FIG. 1 according to the embodiment shown in FIG. 10A. The macroblock representative shown in FIG. 10B represents the macroblock processed by the second prediction sub-unit 1344, and the macroblock representative shown in FIG. 10C represents the macroblock processed by the first prediction sub-unit 1342, where the shaded circles may represent the associated pixel values under processing, while the non-shaded circles may represent the discarded pixel values mentioned above. In order to reduce redundant reconstruction operations, the spatial prediction unit 134 shown in FIG. 10A may utilize one or more of a plurality of patterns, such as the patterns 1011, 1012, 1013, and 1014 shown in FIG. 10D, to perform the reconstruction operations during the low complexity intra prediction. As shown in FIG. 10E, when the spatial prediction unit 134 is reconstructing a current macroblock such as the macroblock 1025, the reconstructed frame output unit 150 provides the spatial prediction unit 134 with the macroblock edge information of an upper macroblock such as the macroblock 1028 and the macroblock edge information of a left macroblock such as the macroblock 1024. For example, the macroblock 1028 can be an inter macroblock (labeled "Inter MB"), and each of the macroblocks 1024 and 1025 can be an intra macroblock (labeled "Intra MB"). Similar descriptions are not repeated for this embodiment.

Figure 11:
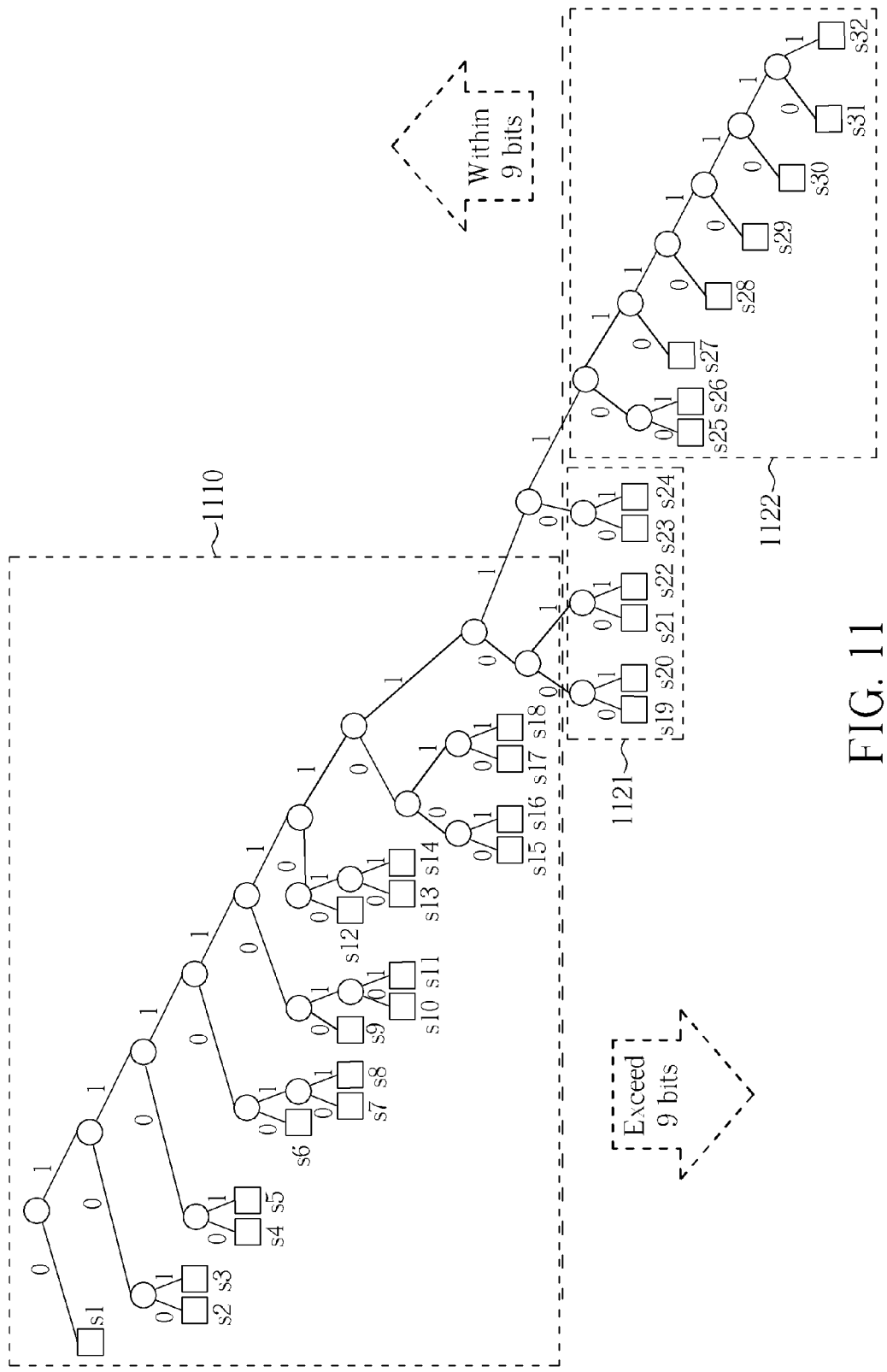
FIG. 11 illustrates a lookup table involved with fast variable length decoding (VLD) of the fast VLD and inverse quantization module shown in FIG. 1 according to an embodiment of the present invention.

FIG. 11 illustrates the aforementioned lookup table involved with the VLD of the fast VLD and inverse quantization module 110 shown in FIG. 1 according to an embodiment of the present invention. As shown in FIG. 11, the numeral 1110 is utilized for representing the aforementioned main table, where the aforementioned at least one sub-table comprises a plurality of sub-tables 1121 and 1122. In general, each entry of the main table 1110 and the sub-tables 1121 and 1122 may comprise a symbol and/or a codeword length, which is sometimes referred to as "CL". In this embodiment, each entry of the main table 1110 and the sub-tables 1121 and 1122 comprises a symbol and a codeword length, and each entry occupies at least a storage space of a size of one word. In addition, the notations s1, s2, . . . , and s32 are taken as examples of the symbols involved with the VLD of the fast VLD and inverse quantization module 110.

In a situation where a codeword length of a codeword is within a predetermined bit size, such as a size of 9 bits, the fast VLD and inverse quantization module 110 utilizes the main table 1110 to store the associated information of the codeword. As a result, the main table 1110 is utilized for table lookup when the codeword length of a codeword is within the predetermined bit size. In a situation where a codeword length of a codeword exceeds the predetermined bit size, the fast VLD and inverse quantization module 110 utilizes the aforementioned at least one sub-table, such as the sub-tables 1121 and 1122, to store the associated information of the codeword. As a result, the sub-tables 1121 and 1122 are utilized for table lookup when the codeword length of a codeword exceeds the predetermined bit size. As the probability of utilizing the main table 1110 is greater than that of any of the sub-tables 1121 and 1122, most table lookup operations are performed according to the main table 1110, causing high efficiency of the table lookup operations. Therefore, the speed of the fast VLD of this embodiment is indeed much faster than that of the related art VLD, causing high performance of the fast VLD and inverse quantization module 110.

In particular, the VLD operations and the inverse quantization operations can be integrated into merged operations such as those mentioned above. Thus, the fast VLD and inverse quantization module 110 performs the fast VLD and inverse quantization by performing the merged operations that are merged from both the VLD operations and the inverse quantization operations, causing high performance of the fast VLD and inverse quantization module 110.

Please note that the related art Huffman decoding scheme is not so efficient. According to the enhanced decoding scheme of this embodiment, by selecting only a portion of the lookup table according to a codeword length of a codeword, the table lookup corresponding to the codeword in this embodiment is mush faster than the table lookup in the related art.

Figure 12:
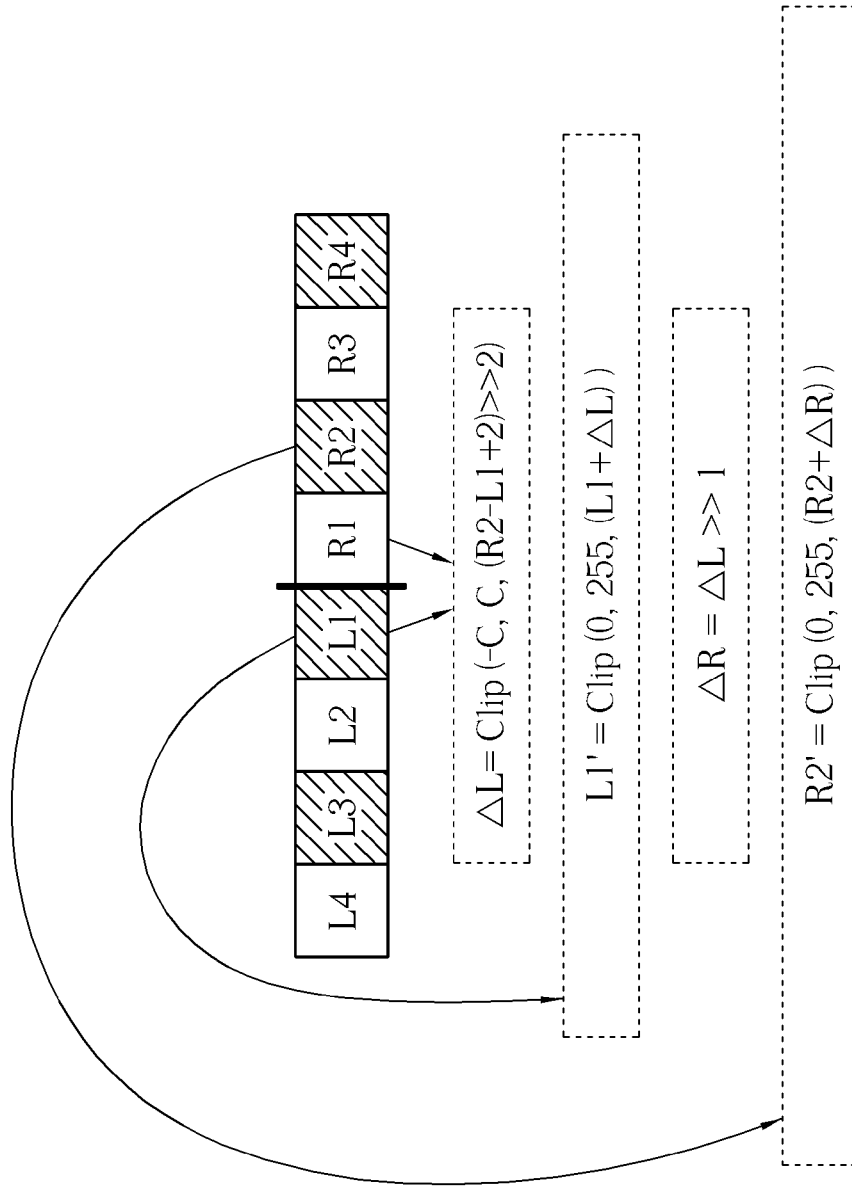
FIG. 12 illustrates a calculation scheme involved with in-loop filtering of the in-loop filter shown in FIG. 1 according to an embodiment of the present invention.

FIG. 12 illustrates a calculation scheme involved with the in-loop filtering of the in-loop filter 152 shown in FIG. 1 according to an embodiment of the present invention. Please note that the notations L1, L3, . . . , etc. and the notations R2, R4, . . . , etc. are taken as examples of the original pixel values of the heavily shaded pixels shown in FIG. 2, and the notations L2, L4, . . . , etc. and the notations R1, R3, . . . , etc. are taken as examples of the discarded pixel values of the non-shaded pixels shown in FIG. 2, where the notations L1', L3', . . . , etc. and the notations R2', R4', . . . , etc. are utilized for representing the in-loop filtered values (i.e. the associated filtered results) of the pixel values L1, L3, . . . , etc. and the pixel values R2, R4, . . . , etc., respectively.

In this embodiment, the in-loop filter 152 performs the in-loop filtering by adjusting a value of existing pixel values (e.g. the pixel values L1 and R2) that are regarded as down sampled values, rather than discarded pixel values (e.g. the pixel values L2 and R1), according to a difference between two of the existing pixel values (e.g. the difference (R2−L1) between the two pixel values R2 and L1), in order to generate a de-blocking filtered value such as an in-loop filtered value (e.g. any of the values L1' and R2'). For example, the calculations for generating the in-loop filtered value L1' and R2' are illustrated in FIG. 12. Given that the notations ">>" and "<<" represent bit shifting operators, the operations of ((R2−L1+2)>>2) and (ΔL>>1) can be respectively expressed as follows:

$$((R2-L1+2)>>2) = (R2-L1+2)/(2^2) = (R2-L1+2)/4; \text{ and}$$

$$(\Delta L >> 1) = \Delta L/(2^1) = \Delta L/2.$$

In addition, the clip function Clip(−C, C, x) represents a hard limiting operation causing the hard limited result of x to be within the range of [−C, C], and ΔL and ΔR can be respectively expressed as follows:

$$\Delta L = \text{Clip}(-C,C,(R2-L1+2)>>2) = \text{Clip}(-C,C,(R2-L1+2)/4); \text{ and}$$

$$\Delta R = \Delta L >> 1 = \Delta L/2 = \text{Clip}(-C,C,(R2-L1+2)/4)/2.$$

As a result, the in-loop filtered value L1' and R2' can be respectively written as follows:

$$L1'=\text{Clip}(0,255,(L1+\Delta L))=\text{Clip}(0,255,(L1+\text{Clip}(-C,C,(R2-L1+2)/4));\text{ and}$$

$$R2'=\text{Clip}(0,255,(R2+\Delta R))=\text{Clip}(0,255,(R2+\text{Clip}(-C,C,(R2-L1+2)/4)/2)).$$

In another embodiment, the low complexity de-blocking filter such as the in-loop filter 152 may perform low complexity de-blocking according to the quantization step size (e.g. the so-called QP value), the macroblock (MB) type, and the edge strength.

It is an advantage of the present invention that the low complexity video decoder of each embodiment/variations disclosed above can be applied to various kinds of digital video applications, where each of the respective components within the low complexity video decoder does not introduce a heavy workload and does not consume much electrical power. Therefore, the cost can be reduced in contrast to the related art, causing great flexibility of implementing digital video systems such as those using the MPEG-2 technology.

Those skilled in the art will readily observe that numerous modifications and alterations of the device and method may be made while retaining the teachings of the invention.

What is claimed is:

1. A low complexity video decoder, comprising:
a fast variable length decoding (VLD) and inverse quantization module arranged to perform fast VLD and inverse quantization on an input bit stream to generate inverse quantization results;
an inverse transform unit arranged to perform inverse transform on the inverse quantization results to generate inverse transform results;
a motion compensation module arranged to perform motion compensation according to the input bit stream and generate associated prediction outputs, wherein the motion compensation module comprises:
a temporal prediction unit arranged to perform temporal prediction to generate at least a portion of the prediction outputs; and
a spatial prediction unit arranged to perform spatial prediction to generate at least a portion of the prediction outputs;
an arithmetic unit arranged to sum up the inverse transform results and the prediction outputs to generate compensated outputs;
a reconstructed frame output unit arranged to generate a plurality of reconstructed frames according to the compensated outputs, wherein the spatial prediction unit performs spatial prediction according to a current reconstructed frame of the reconstructed frames; and
a frame storage arranged to temporarily store at least one portion of the reconstructed frames, wherein the temporal prediction unit performs temporal prediction according to the at least one portion of the reconstructed frames;
wherein the temporal prediction unit operates in accordance with a resolution of the reconstructed frames, rather than a resolution of a plurality of original frames represented by the input bit stream, in order to reduce complexity of performing temporal prediction;
and the temporal prediction unit further estimates at least a portion of partial information that has been omitted, in order to perform sub-pixel interpolation for use of performing temporal prediction.

2. The low complexity video decoder of claim 1, wherein the resolution of the reconstructed frames is less than the resolution of the original frames.

3. The low complexity video decoder of claim 2, wherein for every W by W pixels of an original frame, the low complexity video decoder utilizes at least a bottom right pixel of the W by W pixels for an associated reconstructed frame; and W represents an integer that is greater than one.

4. The low complexity video decoder of claim 3, wherein the low complexity video decoder stores pixel values of all boundary pixels of a bottom boundary and a right boundary within a current macroblock, and stores pixel values of all boundary pixels of a bottom boundary within an upper macroblock and pixel values of all boundary pixels of a right boundary within a left macroblock, for use of intra prediction.

5. The low complexity video decoder of claim 1, wherein the temporal prediction unit estimates at least the portion of the partial information that has been omitted, in order to perform sub-pixel interpolation for use of performing temporal prediction.

6. A low complexity video decoder, comprising:
a fast variable length decoding (VLD) and inverse quantization module arranged to perform fast VLD and inverse quantization on an input bit stream to generate inverse quantization results;
an inverse transform unit arranged to perform inverse transform on the inverse quantization results to generate inverse transform results;
a motion compensation module arranged to perform motion compensation according to the input bit stream and generate associated prediction outputs, wherein the motion compensation module comprises:
a temporal prediction unit arranged to perform temporal prediction to generate at least a portion of the prediction outputs; and
a spatial prediction unit arranged to perform spatial prediction to generate at least a portion of the prediction outputs;
an arithmetic unit arranged to sum up the inverse transform results and the prediction outputs to generate compensated outputs;
a reconstructed frame output unit arranged to generate a plurality of reconstructed frames according to the compensated outputs, wherein the spatial prediction unit performs spatial prediction according to a current reconstructed frame of the reconstructed frames; and
a frame storage arranged to temporarily store at least one portion of the reconstructed frames, wherein the temporal prediction unit performs temporal prediction according to the at least one portion of the reconstructed frames;
wherein the spatial prediction unit operates in accordance with a resolution of the reconstructed frames, rather than a resolution of a plurality of original frames represented by the input bit stream, in order to reduce complexity of performing spatial prediction; and the spatial prediction unit further estimates at least a portion of partial information that has been omitted, in order to perform sub-pixel interpolation for use of performing spatial prediction.

7. The low complexity video decoder of claim 6, wherein the resolution of the reconstructed frames is less than the resolution of the original frames.

8. The low complexity video decoder of claim 7, wherein for every W by W pixels of an original frame, the low complexity video decoder utilizes at least a bottom right pixel of the W by W pixels to generate a corresponding pixel of an associated reconstructed frame; and W represents an integer that is greater than one.

9. The low complexity video decoder of claim 8, wherein the low complexity video decoder stores pixel values of all boundary pixels of a bottom boundary and a right boundary within a current macroblock, and stores pixel values of all boundary pixels of a bottom boundary within an upper macroblock and pixel values of all boundary pixels of a right boundary within a left macroblock, for use of intra prediction.

10. The low complexity video decoder of claim 6, wherein the spatial prediction unit estimates at least the portion of the partial information that has been omitted, in order to perform sub-pixel interpolation for use of performing spatial prediction.

11. A low complexity video decoder, comprising:
a fast variable length decoding (VLD) and inverse quantization module arranged to perform fast VLD and inverse quantization on an input bit stream to generate inverse quantization results;
an inverse transform unit arranged to perform inverse transform on inverse quantization results to generate inverse transform results;
a motion compensation module arranged to perform motion compensation according to the input bit stream and generate associated prediction outputs, wherein the motion compensation module comprises:
a temporal prediction unit arranged to perform temporal prediction to generate at least a portion of the prediction outputs; and
a spatial prediction unit arranged to perform spatial prediction to generate at least a portion of the prediction outputs;
an arithmetic unit arranged to sum up the inverse transform results and the prediction outputs to generate compensated outputs;
a reconstructed frame output unit arranged to generate a plurality of reconstructed frames according to the compensated outputs, wherein the spatial prediction unit performs spatial prediction according to a current reconstructed frame of the reconstructed frames; and
a frame storage arranged to temporarily store at least one portion of the reconstructed frames, wherein the temporal prediction unit performs temporal prediction according to the at least one portion of the reconstructed frames;
wherein the inverse transform unit operates in accordance with a resolution of the reconstructed frames, rather than a resolution of a plurality of original frames represented by the input bit stream, in order to reduce complexity of performing the inverse transform; and the inverse transform unit omits a portion of calculations of the inverse transform.

12. The low complexity video decoder of claim 11, wherein the resolution of the reconstructed frames is less than the resolution of the original frames.

13. The low complexity video decoder of claim 12, wherein for every W by W pixels of an original frame, the low complexity video decoder utilizes at least a bottom right pixel of the W by W pixels to generate a corresponding pixel of an associated reconstructed frame; and W represents an integer that is greater than one.

14. The low complexity video decoder of claim 13, wherein the low complexity video decoder stores pixel values of all boundary pixels of a bottom boundary and a right boundary within a current macroblock, and stores pixel values of all boundary pixels of a bottom boundary within an upper macroblock and pixel values of all boundary pixels of a right boundary within a left macroblock, for use of intra prediction.

15. The low complexity video decoder of claim 11, wherein at least a portion of the predetermined inverse transform functions comprises at least one zero transform coefficient, or the inverse transform unit drops at least a portion of transform coefficients of the selected one of the predetermined inverse transform functions.

16. The low complexity video decoder of claim 11, wherein the inverse transform unit omits a portion of calculations of the inverse transform by analyzing the input bit stream and selecting one of a plurality of predetermined inverse transform functions according to the analyzing result.

17. The low complexity video decoder of claim 11, wherein the fast VLD and inverse quantization module operates in accordance with the resolution of the reconstructed frames, rather than the resolution of the original frames, in order to reduce complexity of performing the fast VLD and inverse quantization; and the fast VLD and inverse quantization module performs the fast VLD and inverse quantization by performing merged operations that are merged from both VLD operations and inverse quantization operations.

18. A low complexity video decoder, comprising:
a fast variable length decoding (VLD) and inverse quantization module arranged to perform fast VLD and inverse quantization on an input bit stream to generate inverse quantization results;
an inverse transform unit arranged to perform inverse transform on the inverse quantization results to generate inverse transform results;
a motion compensation module arranged to perform motion compensation according to the input bit stream and generate associated prediction outputs, wherein the motion compensation module comprises:
a temporal prediction unit arranged to perform temporal prediction to generate at least a portion of the prediction outputs; and
a spatial prediction unit arranged to perform spatial prediction to generate at least a portion of the prediction outputs;
an arithmetic unit arranged to sum up the inverse transform results and the prediction outputs to generate compensated outputs;
a reconstructed frame output unit arranged to generate a plurality of reconstructed frames according to the compensated outputs, wherein the spatial prediction unit performs spatial prediction according to a current reconstructed frame of the reconstructed frames; and
a frame storage arranged to temporarily store at least one portion of the reconstructed frames, wherein the temporal prediction unit performs temporal prediction according to the at least one portion of the reconstructed frames;
wherein the reconstructed frame output unit operates in accordance with a resolution of the reconstructed frames, rather than a resolution of a plurality of original frames represented by the input bit stream, in order to reduce complexity of generating the reconstructed frames; and the reconstructed frame output unit comprises a low complexity de-blocking filter.

19. The low complexity video decoder of claim 18, wherein the resolution of the reconstructed frames is less than the resolution of the original frames.

20. The low complexity video decoder of claim 19, wherein for every W by W pixels of an original frame, the low complexity video decoder utilizes at least a bottom right pixel of the W by W pixels to generate a corresponding pixel of an associated reconstructed frame; and W represents an integer that is greater than one.

21. The low complexity video decoder of claim 20, wherein the low complexity video decoder stores pixel values of all boundary pixels of a bottom boundary and a right boundary within a current macroblock, and stores pixel values of all boundary pixels of a bottom boundary within an upper macroblock and pixel values of all boundary pixels of a right boundary within a left macroblock, for use of intra prediction.

22. The low complexity video decoder of claim 19, wherein the low complexity de-blocking filter performs filtering by adjusting a value of existing pixel values that are regarded as down sampled values, rather than discarded pixel values, according to a difference between two of the existing pixel values, in order to generate a de-blocking filtered value.

23. The low complexity video decoder of claim 18, wherein the low complexity de-blocking filter performs low complexity de-blocking according to a quantization step size, a macroblock (MB) type, and edge strength.

24. A low complexity video decoder, comprising:
a fast variable length decoding (VLD) and inverse quantization module arranged to perform fast VLD and inverse quantization on an input bit stream to generate inverse quantization results;
an inverse transform unit arranged to perform inverse transform on the inverse quantization results to generate inverse transform results;
a motion compensation module arranged to perform motion compensation according to the input bit stream and generate associated prediction outputs, wherein the motion compensation module comprises:
a temporal prediction unit arranged to perform temporal prediction to generate at least a portion of the prediction outputs; and
a spatial prediction unit arranged to perform spatial prediction to generate at least a portion of the prediction outputs;
an arithmetic unit arranged to sum up the inverse transform results and the prediction outputs to generate compensated outputs;
a reconstructed frame output unit arranged to generate a plurality of reconstructed frames according to the compensated outputs, wherein the spatial prediction unit performs spatial prediction according to a current reconstructed frame of the reconstructed frames; and
a frame storage arranged to temporarily store at least one portion of the reconstructed frames, wherein the temporal prediction unit performs temporal prediction according to the at least one portion of the reconstructed frames;
wherein the fast VLD and inverse quantization module operates in accordance with a resolution of the reconstructed frames, rather than a resolution of a plurality of original frames represented by the input bit stream, in order to reduce complexity of performing fast VLD and inverse quantization; and the fast VLD and inverse quantization module utilizes a lookup table comprising a main table and at least one sub-table during fast VLD, and a probability of utilizing the main table is greater than that of the at least one sub-table.

25. The low complexity video decoder of claim 24, wherein the resolution of the reconstructed frames is less than the resolution of the original frames.

26. The low complexity video decoder of claim 25, wherein for every W by W pixels of an original frame, the low complexity video decoder utilizes at least a bottom right pixel of the W by W pixels to generate a corresponding pixel of an associated reconstructed frame; and W represents an integer that is greater than one.

27. The low complexity video decoder of claim 26, wherein the low complexity video decoder stores pixel values of all boundary pixels of a bottom boundary and a right boundary within a current macroblock, and stores pixel values of all boundary pixels of a bottom boundary within an upper macroblock and pixel values of all boundary pixels of a right boundary within a left macroblock, for use of intra prediction.

28. The low complexity video decoder of claim 24, wherein each entry of the main table and the sub-table comprises a symbol and/or a codeword length; and each entry occupies at least a storage space of a size of one word.

29. The low complexity video decoder of claim 24, wherein in a situation where a codeword length of a codeword exceeds a predetermined bit size, the fast VLD and inverse quantization module utilizes the at least one sub-table to store associated information of the codeword.

30. The low complexity video decoder of claim 24, wherein the fast VLD and inverse quantization module performs fast VLD and inverse quantization by performing merged operations that are merged from both VLD operations and inverse quantization operations.

\* \* \* \* \*